RECORD SHEET FEEDING AND LINE SELECTION MECHANISM

Filed Sept. 8, 1959 16 Sheets-Sheet 1

INVENTORS.
ROBERT S. BRADSHAW
ANDREAS G. MARKGRAF
BY William R. Nolte
AGENT

Aug. 15, 1961 R. S. BRADSHAW ET AL 2,996,166

RECORD SHEET FEEDING AND LINE SELECTION MECHANISM

Filed Sept. 8, 1959 16 Sheets-Sheet 2

INVENTORS.
ROBERT S. BRADSHAW
ANDREAS G. MARKGRAF

BY William R. Nolte

AGENT

INVENTORS.
ROBERT S. BRADSHAW
ANDREAS G. MARKGRAF
BY
William R. Nolte
AGENT

INVENTORS.
ROBERT S. BRADSHAW
ANDREAS G. MARKGRAF
BY William R. Nolte
AGENT

RECORD SHEET FEEDING AND LINE SELECTION MECHANISM

Filed Sept. 8, 1959 16 Sheets-Sheet 5

INVENTORS.
ROBERT S. BRADSHAW
ANDREAS G. MARKGRAF
BY William R. Nolte
AGENT

RECORD SHEET FEEDING AND LINE SELECTION MECHANISM

Filed Sept. 8, 1959 16 Sheets-Sheet 6

INVENTORS.
ROBERT S. BRADSHAW
ANDREAS G. MARKGRAF
BY William R. Nolte
AGENT

RECORD SHEET FEEDING AND LINE SELECTION MECHANISM

Filed Sept. 8, 1959

*INVENTORS.*
ROBERT S. BRADSHAW
ANDREAS G. MARKGRAF
BY
William R. Nolte
AGENT

INVENTORS.
ROBERT S. BRADSHAW
ANDREAS G. MARKGRAF
BY
William R. Nolte
AGENT

Aug. 15, 1961 R. S. BRADSHAW ET AL 2,996,166

RECORD SHEET FEEDING AND LINE SELECTION MECHANISM

Filed Sept. 8, 1959 16 Sheets-Sheet 9

INVENTORS.
ROBERT S. BRADSHAW
ANDREAS G. MARKGRAF
BY William R. Nolte
AGENT

RECORD SHEET FEEDING AND LINE SELECTION MECHANISM

INVENTORS.
ROBERT S. BRADSHAW
ANDREAS G. MARKGRAF
BY William R. Nolte
AGENT

Aug. 15, 1961 R. S. BRADSHAW ET AL 2,996,166

RECORD SHEET FEEDING AND LINE SELECTION MECHANISM

Filed Sept. 8, 1959 16 Sheets-Sheet 11

INVENTORS.
ROBERT S. BRADSHAW
ANDREAS G. MARKGRAF
BY William R. Nolte
AGENT

INVENTORS.
ROBERT S. BRADSHAW
ANDREAS G. MARKGRAF
BY
William R. Nolte
AGENT

RECORD SHEET FEEDING AND LINE SELECTION MECHANISM

INVENTORS.
ROBERT S. BRADSHAW
ANDREAS G. MARKGRAF
BY
William R. Nolte
AGENT

INVENTORS.
ROBERT S. BRADSHAW
ANDREAS G. MARKGRAF
BY
William R. Nolte
AGENT

INVENTORS.
ROBERT S. BRADSHAW
ANDREAS G. MARKGRAF

BY William R. Nolte

AGENT

INVENTORS.
ROBERT S. BRADSHAW
ANDREAS G. MARKGRAF
BY
William R. Nolte
AGENT 2,996,166
Patented Aug. 15, 1961

2,996,166
RECORD SHEET FEEDING AND LINE SELECTION MECHANISM

Robert S. Bradshaw, Broomall, and Andreas G. Markgraf, Philadelphia, Pa., assignors to Burroughs Corporation, Detroit, Mich., a corporation of Michigan Filed Sept. 8, 1959, Ser. No. 838,468
31 Claims. (Cl. 197—130)

This invention relates broadly to document handling apparatus and more particularly to apparatus for stopping a moving sheet or document at a position in which a selected line thereof is presented for printing or other operation thereon. The invention has particular applicability to accounting machines employing account balance recording and reading devices and to the positioning of documents or ledgers for posting operations.

Heretofore, line find mechanisms have been suggested which were controlled by data entered on the document or ledger in one form or another, sometimes by provision of magnetic spots thereon, for stopping the ledgers at the desired posting position for entry of new information on the ledgers. Such ledger stopping provisions, although satisfactory for relatively slow feed operations and in circumstances involving reverse feed of the documents, were not designed for or capable of handling and precisely stopping documents and ledgers moving at relatively high speeds.

An important object of the present invention is to provide improved apparatus for control of documents and ledgers.

Another important object of the invention is to provide improved apparatus for positioning sheet items such as ledger cards at desired locations for receiving data impressions.

Another important object of the invention is to provide an improved presettable high speed operating mechanism for precisely stopping a fast moving sheet at a desired position.

A further important object of the invention is to provide a high speed mechanism which is capable of stopping a sheet selected from a flow of successively fed sheet items at any one of numerous line printing positions.

Another important object of the invention is to provide an improved, fast operating line indexing device for stopping a rapidly moving sheet item at the desired printing position and for subsequently advancing the item line by line for further printing operations.

Another important object of the invention is to provide a document or ledger stopping mechanism having a high degree of flexibility in operation and capable with the use of a relatively few control devices of stopping a selected ledger sheet at one of a large number of positions.

A further important object of the invention is to provide a mechanism of this character which is designed in an improved manner for substantially eliminating loss of time required for resetting the mechanism for receiving a subsequent ledger, the resetting thereof occurring during the ejection of each sheet or ledger from the mechanism.

In carrying out the objects of the invention, a mechanism embodying the invention provides in an accurate reliable manner for the proper positioning of documents and ledgers at a printing station. The mechanism is capable in one operating condition of providing free flow of ledgers and documents therethrough at compartively high speeds and in another operating condition of instantly stopping a selected ledger or document at precisely the desired line where a printing operation is to occur. Each document or ledger card is driven by rollers which stop when paper movement is restricted, but which have sufficient torque to accelerate the ledgers or documents to transport velocity when it is free to move. As the selected document or ledger approaches the printing area, a movable stop or tab is released just ahead of the ledger and the two advance approximately at the same rate of speed until the tab reaches a position indexed by control devices, at which time its movement is arrested to serve as a stop for the ledger. The tab traverses an orbital path to provide recurrent cyclical operations and for this purpose it may be carried on a movable endless belt.

Incorporated in the line selecting mechanism of the invention is a differential device which is capable of being permutably operated from individual control devices for stopping the movable tab and following ledger at any one of a large number of printing line positions. The differential is accumulatively operable and will sum the operation of the selected control devices to arrest the movement of the tab to stop the ledger at the desired printing line position, and after having so initially positioned the lerger the differential will also allow the document to be advanced a single line at a time thereafter until the termination of the printing operation on the ledger. Upon completion of the entry of the desired data onto the ledger card, it will be ejected from the line selecting mechanism while at the same time the mechanism is resetting itself for another operating cycle on a following ledger card.

Various other objects, advantages and meritorious features of the invention will become more fully apparent from the following specification, appended claims, and accompanying drawings, wherein:

Figure 2:
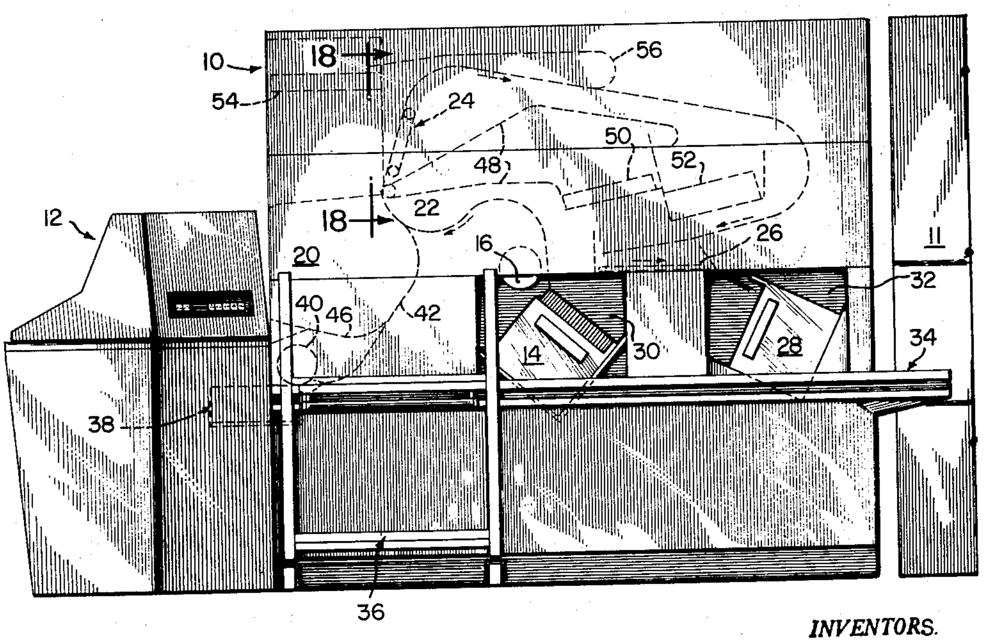
FIG. 2 is a right side elevational view of the bank bookkeeping machine of FIG. 1.
Figure 3:
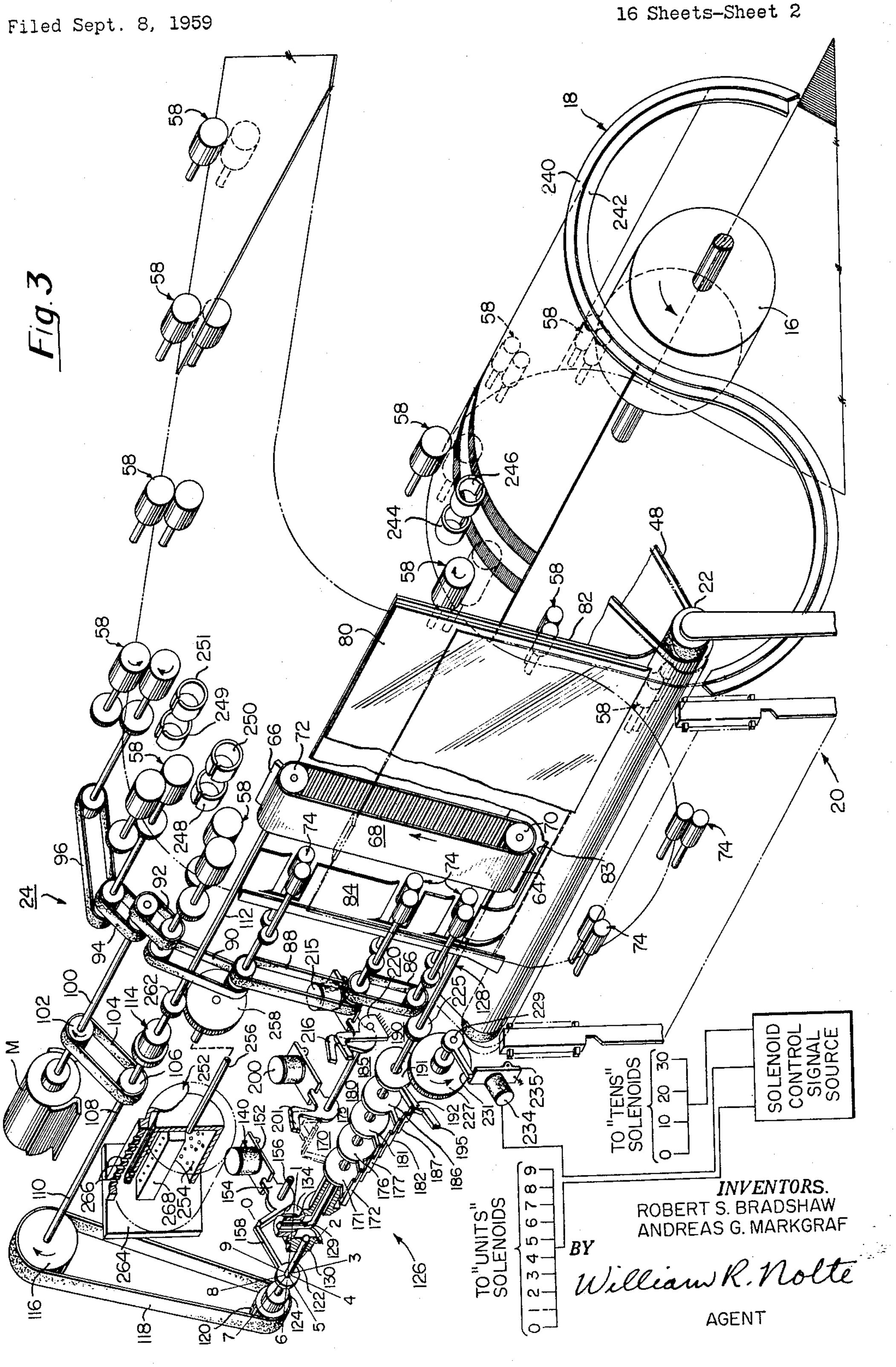
FIG. 3 is a schematic pictorial view showing the main components of the sheet transporting and line selecting mechanism of the present invention.
Figure 3A:
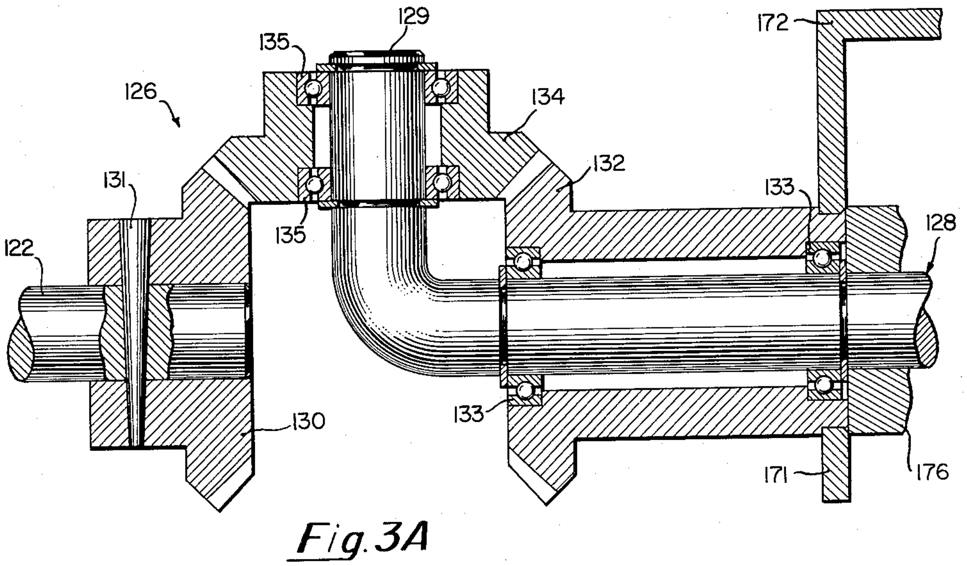
Figure 39:
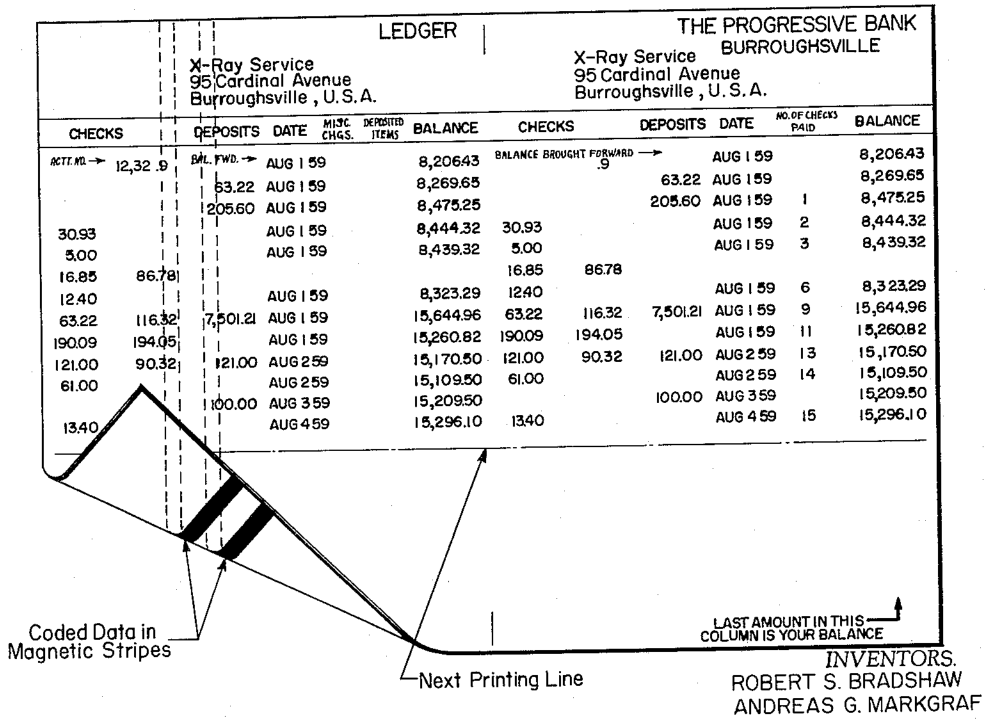
Figures 4, 5, 6:
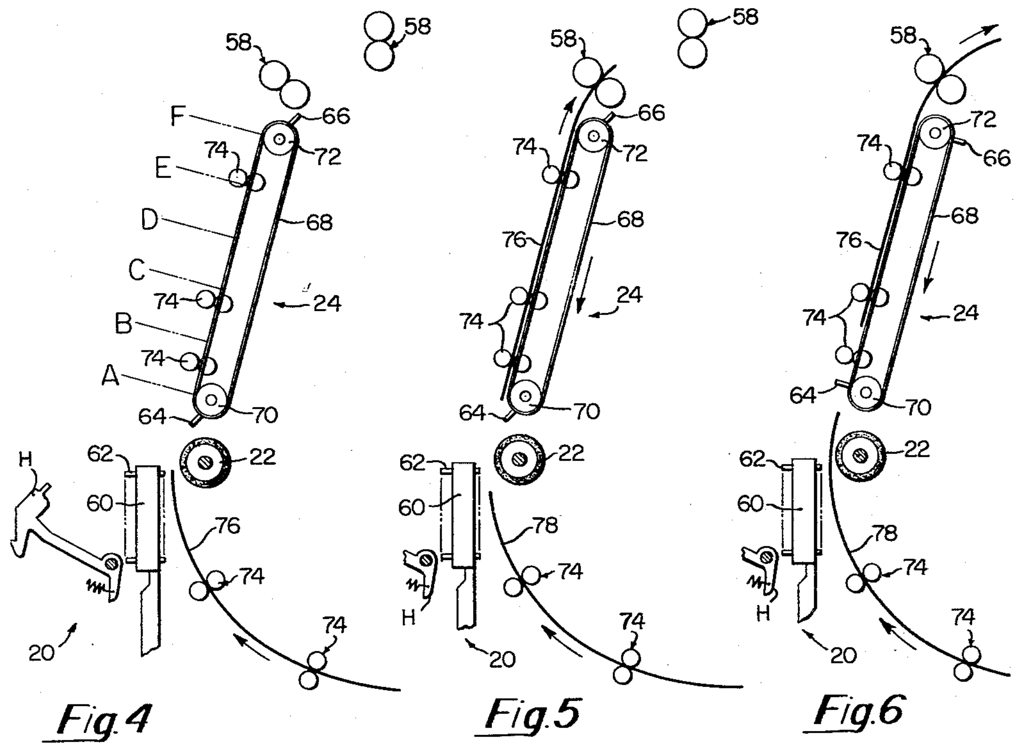
Figure 18:
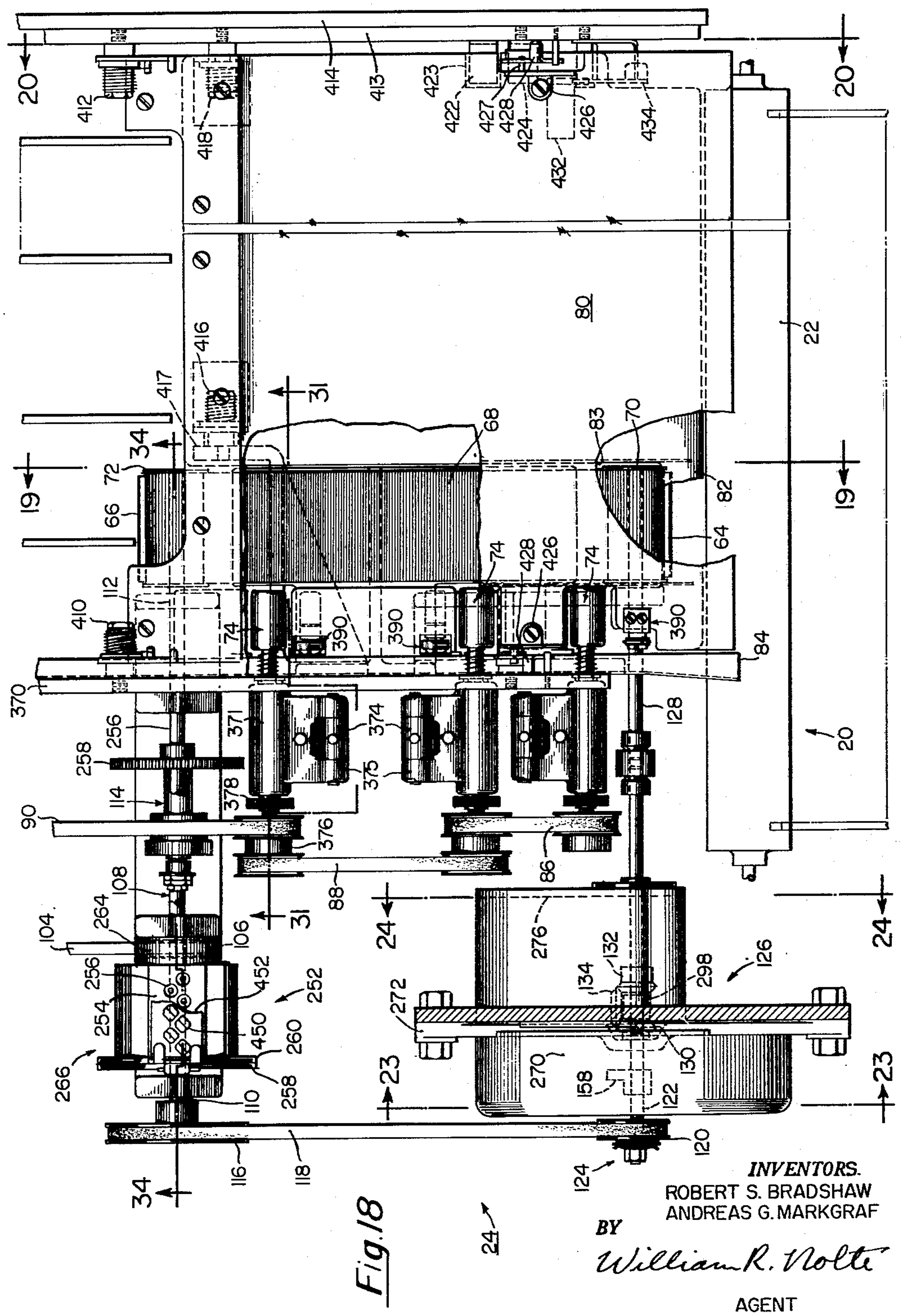
Figure 19:
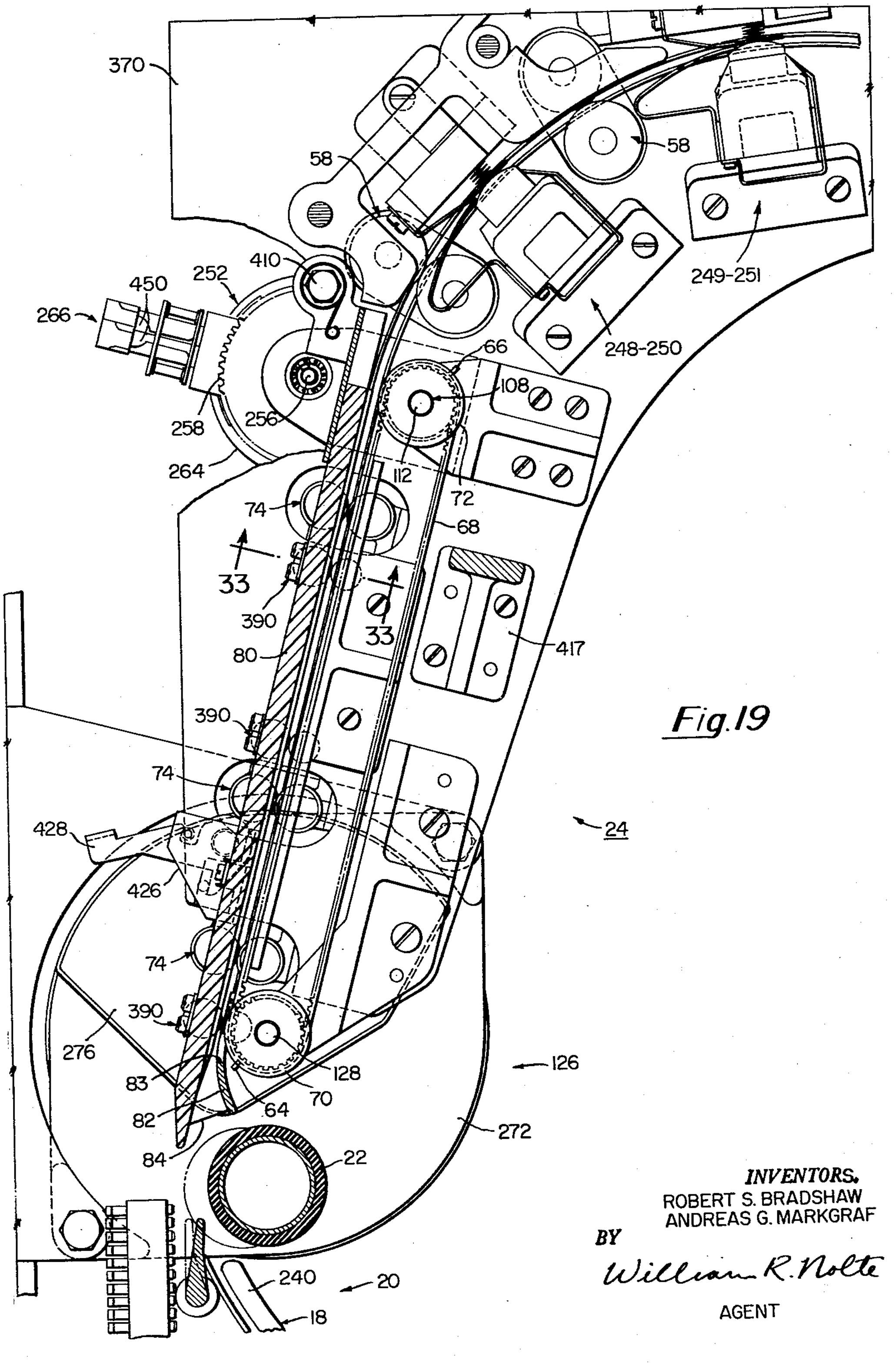
Figures 20, 21, 22:
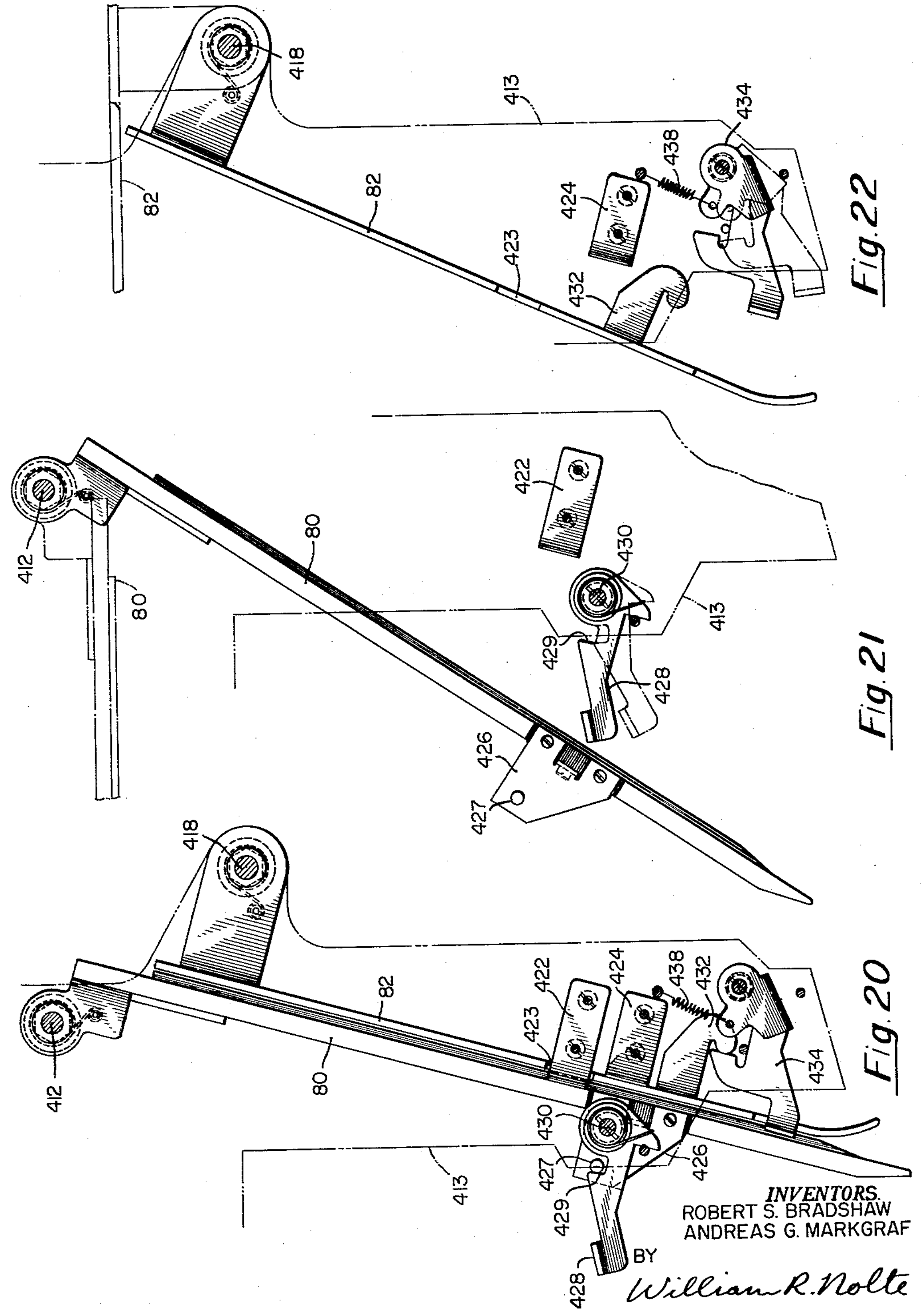
Figure 23:
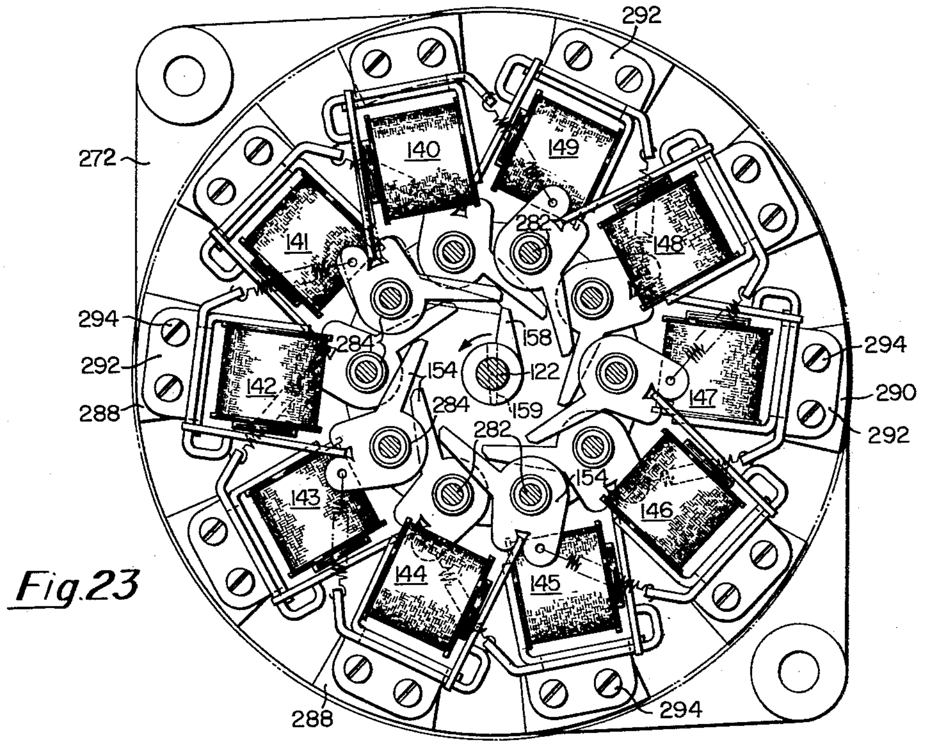
Figure 24:
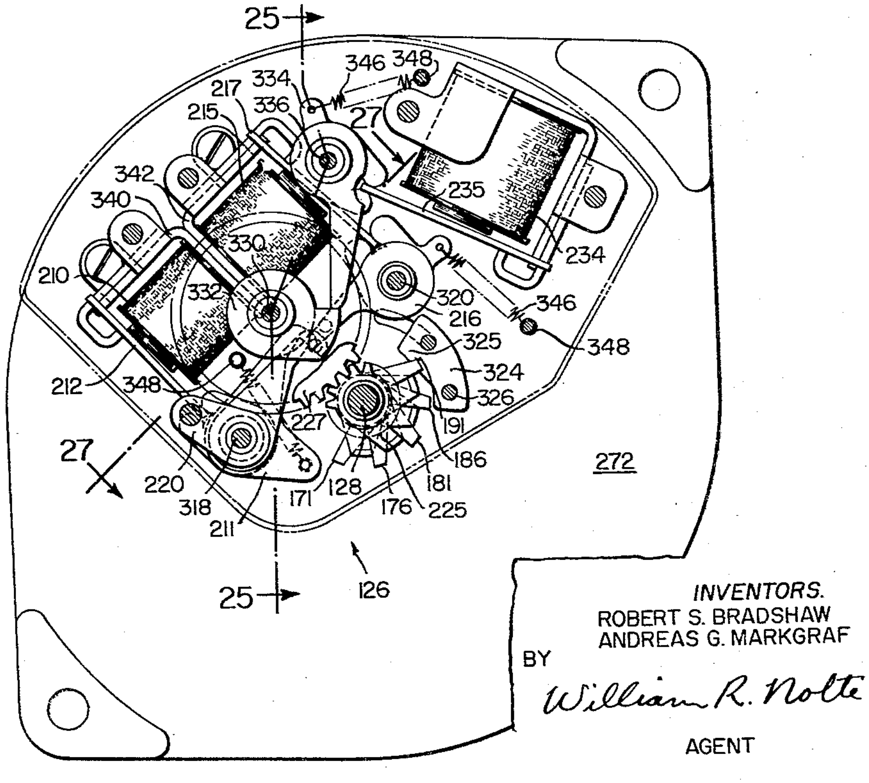
Figure 26:
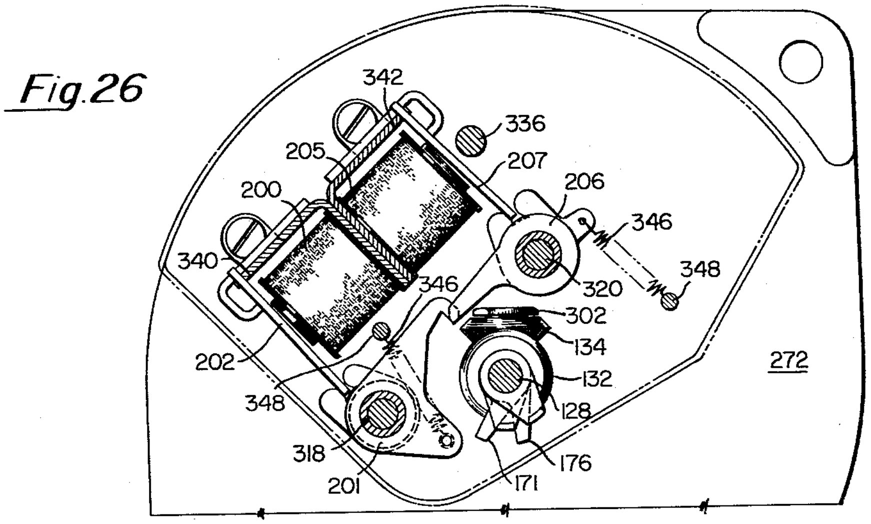
Figure 25:
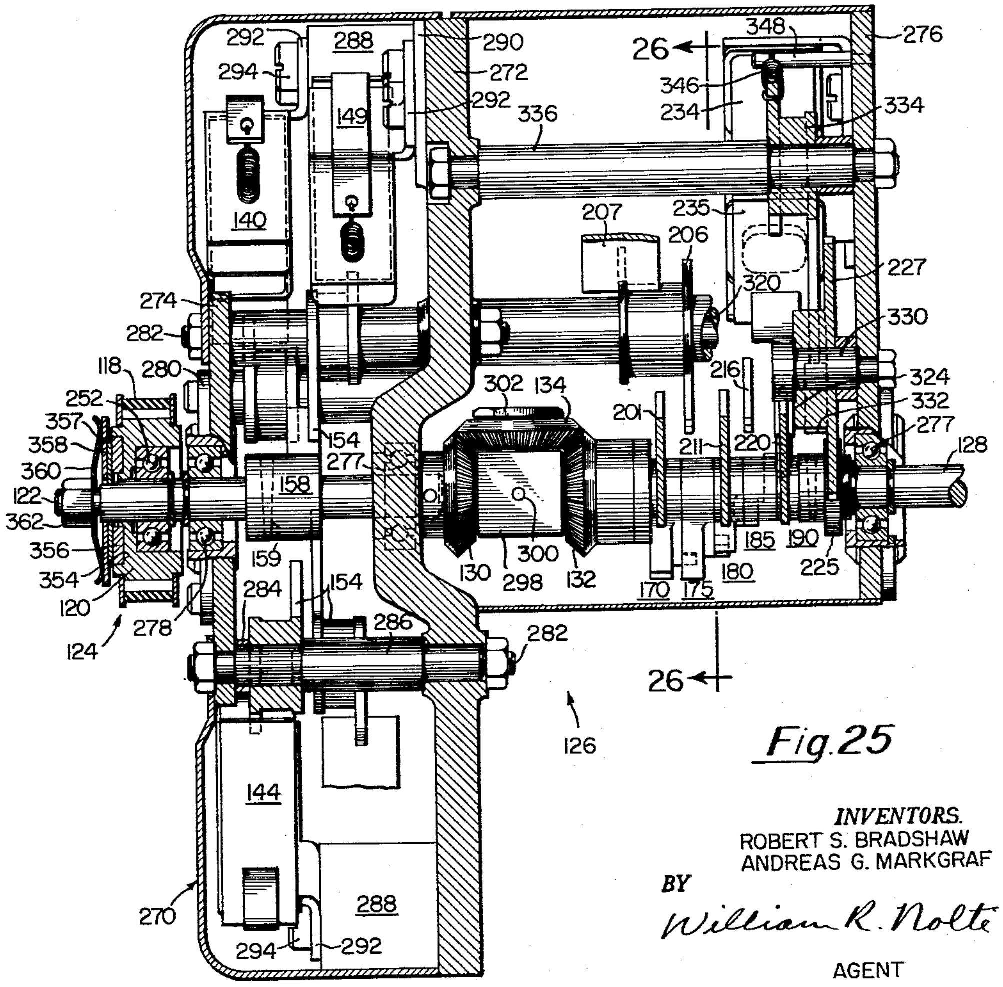
Figures 27, 28, 29, 30:
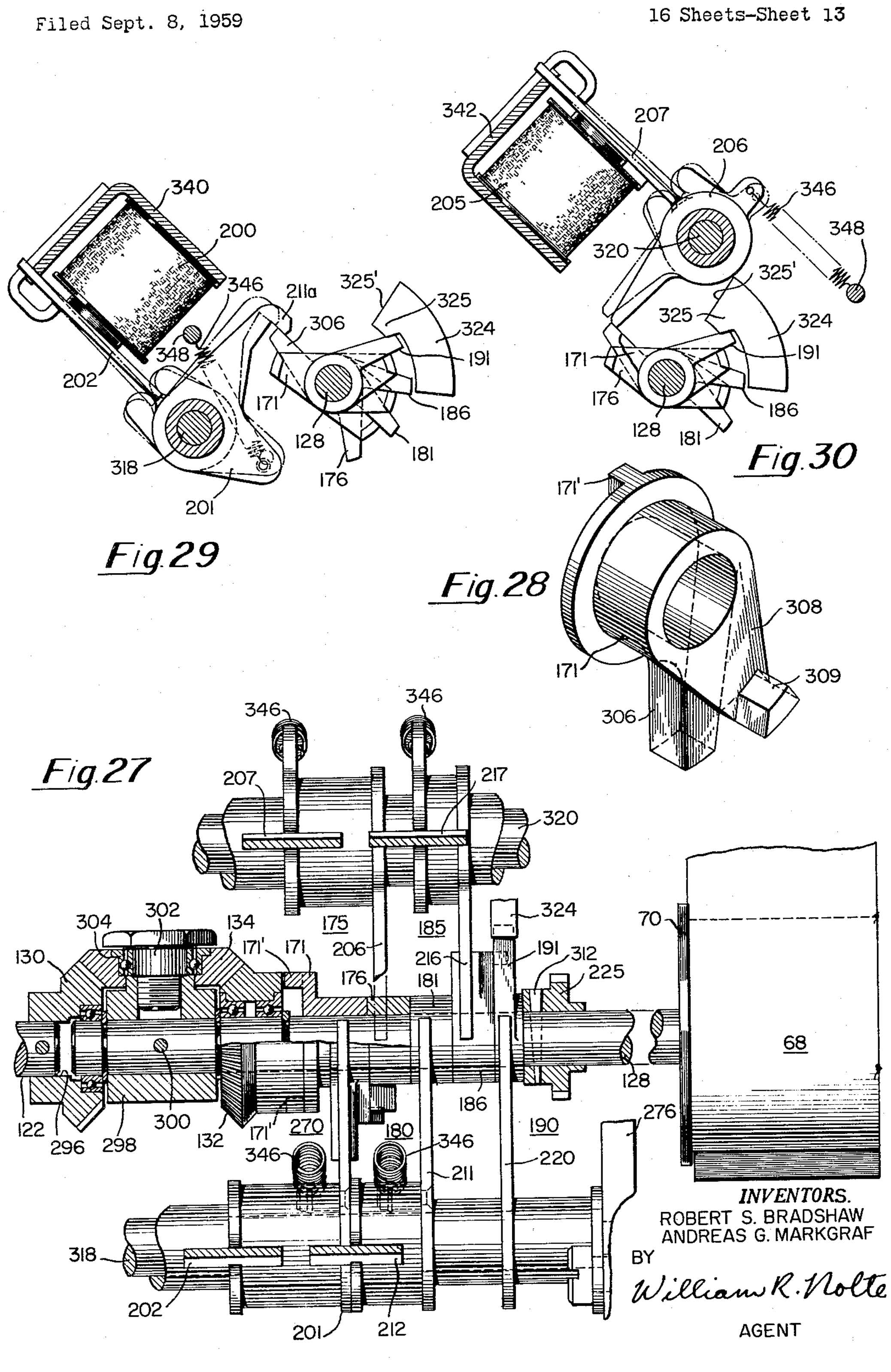
Figure 31:
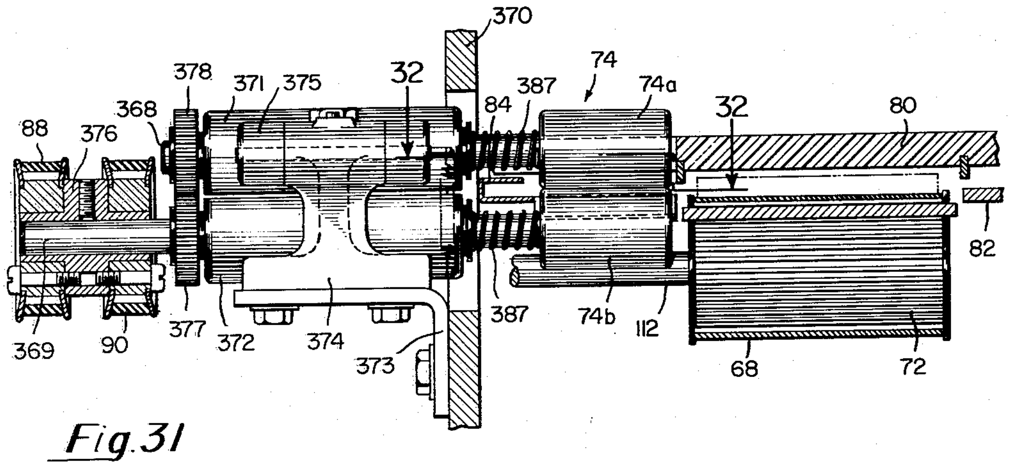
Figure 32:
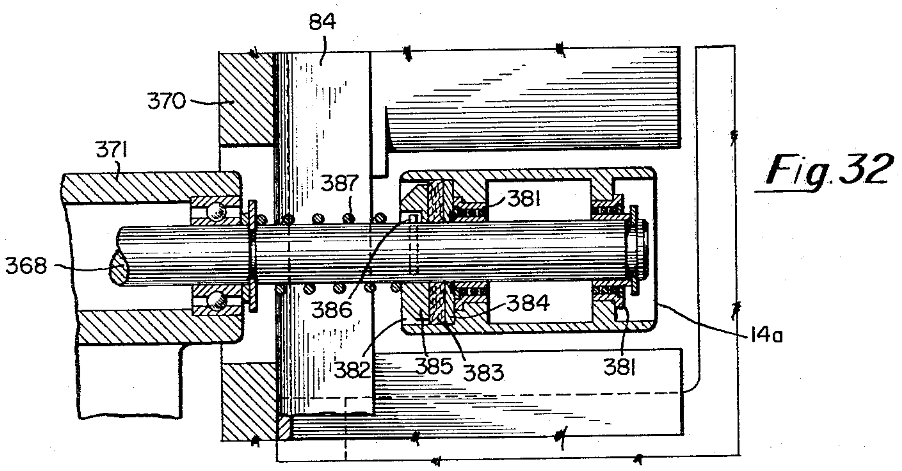
Figure 33:
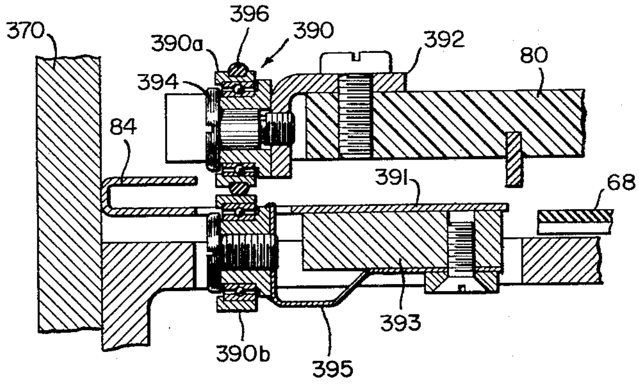
Figures 34, 36, 37:
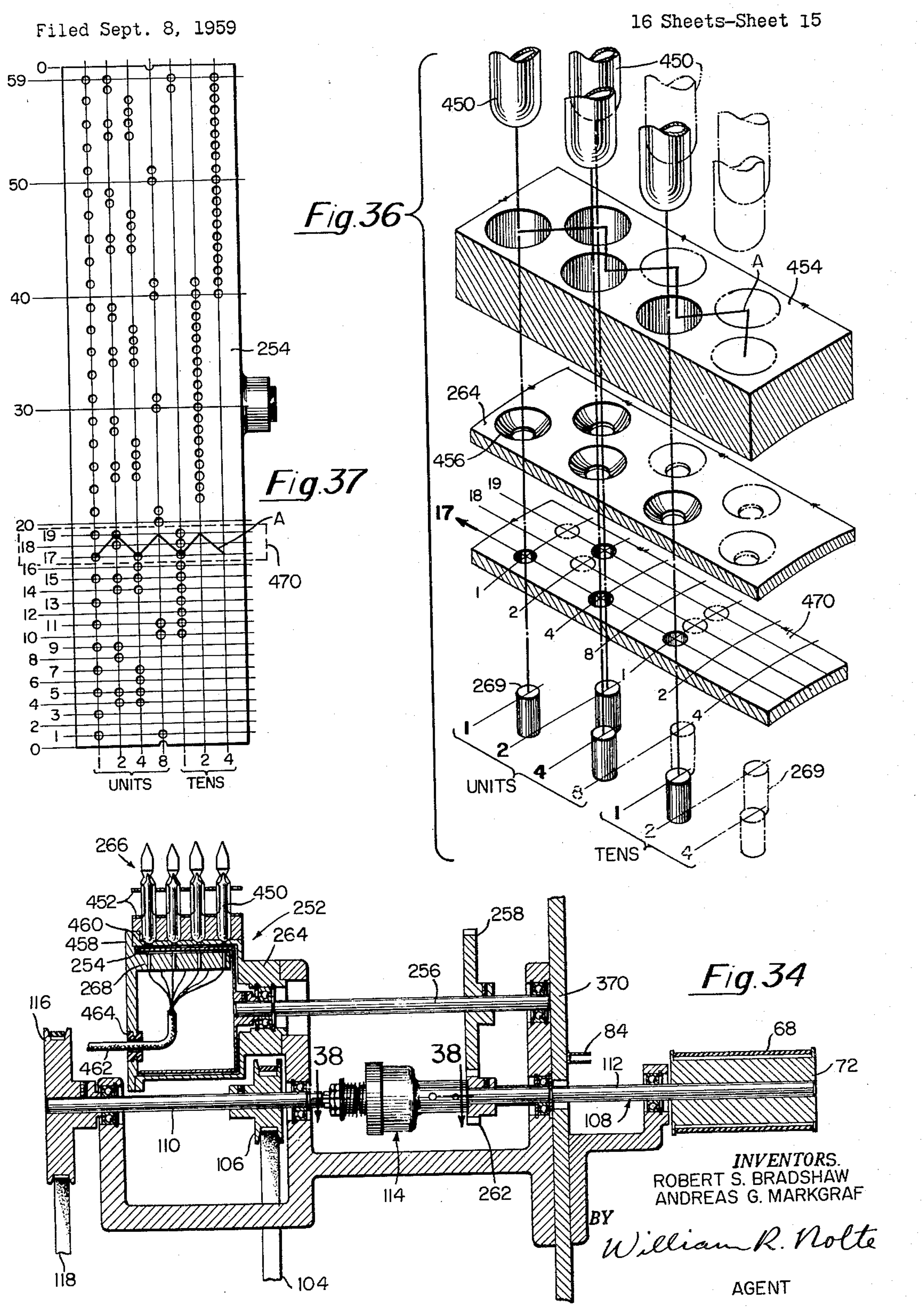
Figures 35, 38:
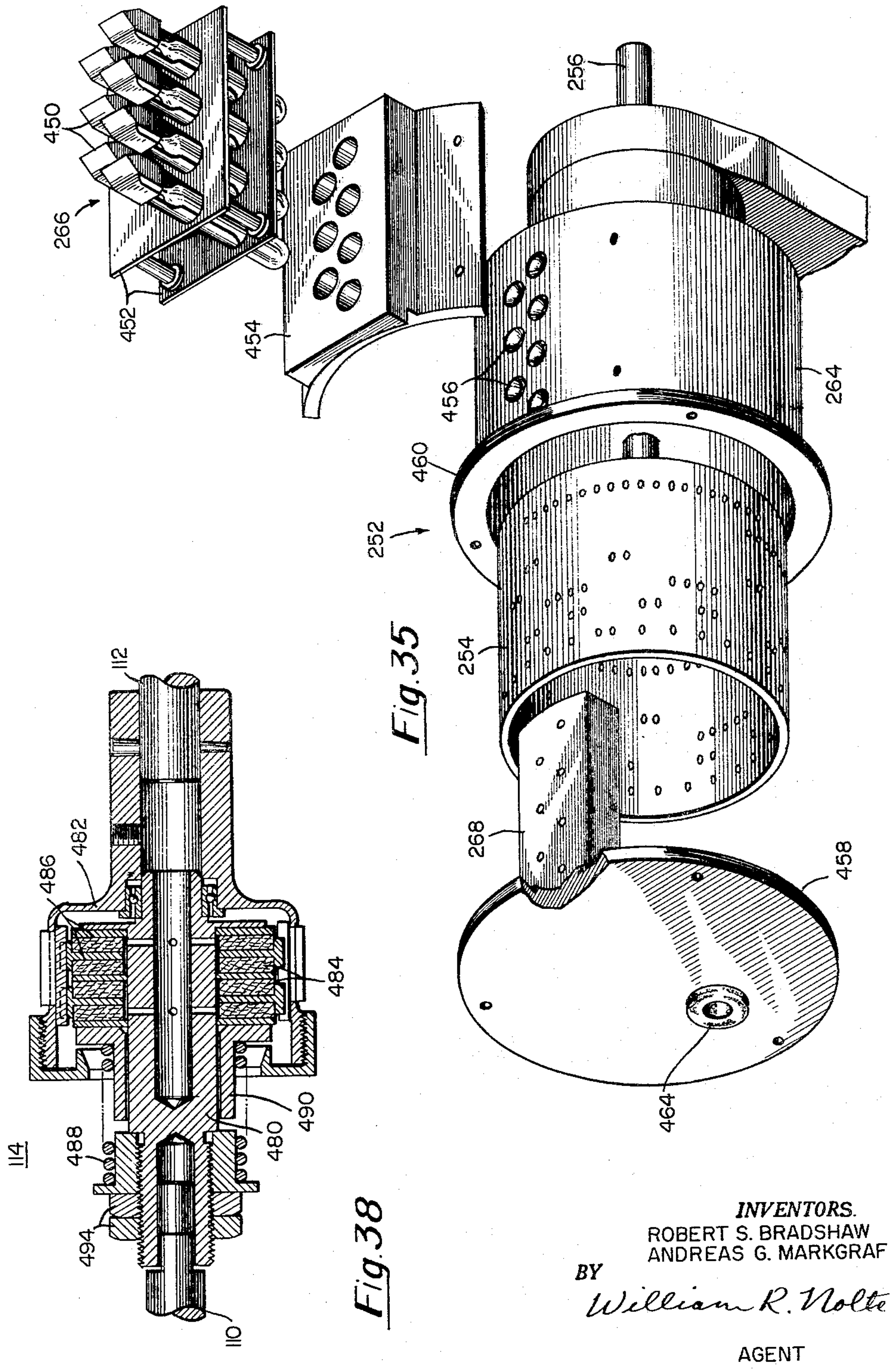

FIG. 3*a* is an enlarged view of the differential gear mechanism shown in FIG. 3;

FIGS. 4 to 8 inclusive are diagrammatic views illustrating progressive action of the line selecting mechanism with the flow of sheet items therethrough;

FIGS. 9 to 17 inclusive are enlarged pictorial views of part of the differential control device of the line selecting mechanism and illustrate various operating positions thereof;

FIG. 18 is a front elevational view of a preferred structural embodiment of a sheet feeding and line selecting mechanism constructed in accordance with the invention and taken along the line 18—18 of FIG. 2;

FIG. 19 is a slightly enlarged vertical sectional view taken along the line 19—19 of FIG. 18;

FIG. 20 is a slightly enlarged vertical sectional view taken along the line 20—20 of FIG. 18 and illustrating the front and back plates of the line selecting mechanism;

FIGS. 21 and 22 illustrate hinge positions of the front and back plates respectively of the line selecting mechanism;

FIG. 23 is an enlarged vertical sectional view taken along the line 23—23 of FIG. 18 and illustrating the assembly of the "units" control devices of the differential of the line selecting mechanism;

FIG. 24 is an enlarged vertical sectional view taken along line 24—24 of FIG. 18 and illustrating the assembly of the "tens" control device of the differential of the line selecting mechanism;

FIG. 25 is a sectional view taken along line 25—25 of FIG. 24 and showing the internal disposition of the differential and its controls within an enclosure of a preferred structural embodiment of the invention;

FIG. 26 is a vertical sectional view taken along the line 26—26 of FIG. 25;

FIG. 27 is a sectional view taken along the line 27—27 of FIG. 4;

FIG. 28 is an enlarged isometric view of one of several rotatable elements associated with the control portion of the line selecting mechanism;

FIG. 29 is a fragmentary view of one of the two operating elements shown in FIG. 26 and illustrating by full and dotted lines two operating positions thereof;

FIG. 30 is a fragmentary view of the other of the two operating elements in FIG. 26 and illustrating by full and dotted lines two operating positions thereof;

FIG. 31 is a horizontal sectional view taken along the line 31—31 of FIG. 18 and illustrating one set of drive rollers and associated guide aligning structure;

FIG. 32 is an enlarged sectional view taken along the line 32—32 of FIG. 31 and illustrating the detail structure of one of the frictional drive rollers for advancing the sheet items;

FIG. 33 is an enlarged cross-sectional view taken along the line 33—33 of FIG. 19 and illustrates details of the edge aligning guide and associated gripper rollers of the sheet transport means in the line selecting mechanism;

FIG. 34 is an enlarged horizontal sectional view taken along the line 34—34 of FIG. 18 and illustrating an optical read-out device for indicating the line printing positions of the line selecting mechanism;

FIG. 35 is an exploded perspective view of the optical code-converter of the read-out device illustrated in FIG. 34;

FIG. 36 is an exploded diagrammatical view of portions of the optical code converter of the read-out device and illustrates certain of the light transmitting patterns thereof;

FIG. 37 is a developed view in plane of the rotatable coded drum of the read-out device;

FIG. 38 is an enlarged sectional view taken along the line 38—38 of FIG. 34 and illustrating the clutch through which torque is applied for driving the control and sheet positioning stops of the line selecting mechanism; and FIG. 39 illustrates a typical record sheet containing both visual and coded data thereon for use in the line selecting mechanism of the invention.

The mechanism embodying the invention is particularly adapted for line selecting operation in association with a printer, the mechanism functioning to position a sheet or record member at a desired line for the printer to print thereon. Such a line selecting mechanism and its mode of operation is schematically shown in FIGS. 3–17 inclusive of the drawings and as forming part of a sheet transport system wherein the sheet items are sequentially fed in one direction past the printer. FIGS. 18–38 disclose in detail a preferred embodiment of the invention which incorporates the structural features shown in the schematic views. The invention has particular utility in the high speed handling of office records such as business forms, bank documents and ledgers, and for a fuller understanding of the achievements of the invention and the economies resulting therefrom, the illustrated embodiment of the invention is shown and described in association with a bank ledger processing unit generally depicted in FIGS. 1 and 2.

Figure 1:
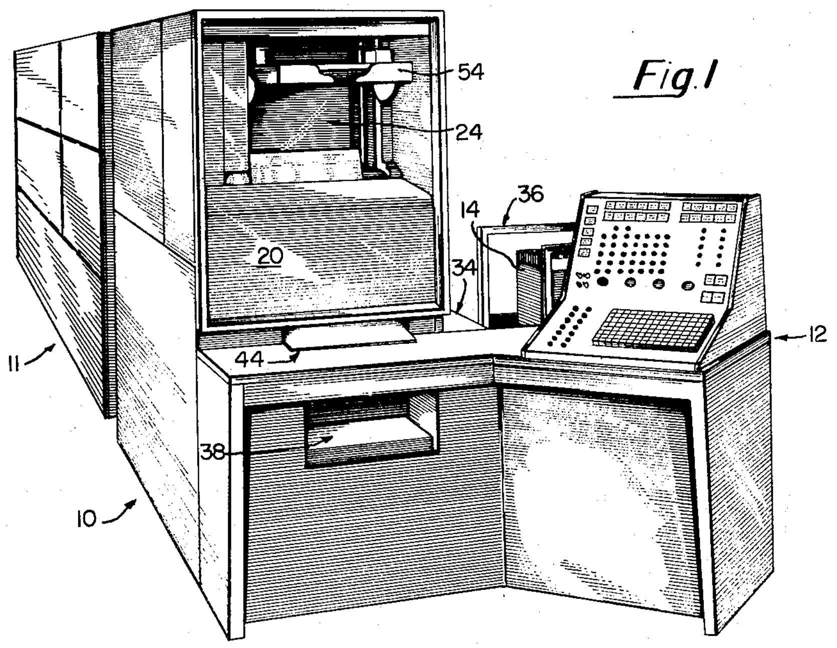
FIG. 1 is a front perspective view of a bank bookkeeping machine embodying the line selecting mechanism of the present invention.

With more particular reference to FIGS. 1 and 2, there are shown the front and side views respectively of a bank ledger processing unit incorporating a line selecting mechanism of the present invention. Certain features of this ledger processing unit are described and claimed in the copending application for patent of Robert S. Bradshaw, entitled "Sheet Handling Apparatus," Serial No. 830,391, filed July 29, 1959, and assigned to the same assignee as that of the present invention. It is to be understood, however, that the invention is not limited to such usage but may be incorporated in other similar systems or utilized in other environment.

The document processor system shown in FIGS. 1 and 2 comprises an enclosure or cabinet generally indicated at 10 which may be rectangularly shaped as shown and houses document handling apparatus, a second cabinet generally indicated as at 11 which likewise may be rectangularly shaped as shown for housing the control circuitry of the document handling apparatus, and an operator control console therefor generally indicated at 12. Devices inside of the cabinet 10 may include a removable supply magazine 14 serving as a supply of record sheets or ledger cards and from which the cards are individually and successively drawn by a suitable feeding device indicated at 16 for advancing these cards through a principal sheet transporting path 18 in the direction of the arrows associated therewith. This principal transport path leads to a data imprinting station generally indicated at 20 in the front portion of the cabinet assuming the form of a printer and represented in FIG. 2 by the platen 22. From thence the path leads into and through the line selecting mechanism of the present invention generally indicated at 24 and in the illustrated ledger processor being located above the printer. From the line selecting mechanism the record forms or ledger cards are normally conveyed by the path 18 and after having their direction of advancement reversed at the terminus of the path as indicated at 26 the cards are fed into a removable receiving magazine 28. It is apparent in the ledger processor illustrated that the principal feeding path 18 assumes the configuration of a substantially closed loop having its terminal ends relatively close together, as shown in FIG. 2.

The supply and receiving magazines 14 and 28 are removably received through openings 30 and 32 respectively in the right side wall of the cabinet and preferably the magazines are similarly constructed for interchangeability. Thus, record forms or ledger cards may be repeatedly processed through the unit 10 including the printer and line selecting devices 20 and 24 without manual intervention except for interchanging and inserting and removing the magazines. As an aid for shifting the magazines and for inserting new magazines and removing unwanted magazines, the processor unit is provided with a platform 34 running along the right side thereof, and as shown in FIGS. 1 and 2, a wheeled cart 36 of the same height as the platform may be provided for carrying ledger containing magazines to and from the unit.

The ledger processor 10 has provision for introducing additional ledger cards into the primary path 18. One such provision is an auxiliary supply bin 38 having a feeding device 40, which on demand from the machine will automatically extract cards from the bin and direct them into a feed path 42 which merges with the primary path 18 in advance of the printing station. Another such provision is a manual card feeding station indicated generally at 44 on the front side of the unit, which enables the operator to introduce record forms into the system at will, its feed path 46 merging with the feed path 42 from the auxiliary supply bin as shown in FIG. 2. The various sources of supply of the record members and their manner of conduction to the printer form no part of the present invention but are mentioned to show the variety of document sources and the variability of the sequence of the documents which are capable of being transported through the printer and its associated line selecting mechanism. The present invention is particularly advantageous in such a system since, as it will be described in more detail hereinafter, it is capable at one interval of time of allowing free flow of documents or ledger cards through the printer and at any given instant of time to stop a selected ledger card at precisely the desired line for impression by the printer and to index such card in the printer while successive lines are printed thereon until the control unit 11 signals the exit of the card from the printer and the line selecting mechanism.

Additional features of the ledger processor unit of FIGS. 1 and 2 include a second document feeding path 48, which, as shown in FIG. 2, may assume a substantially closed loop formation and be substantially wholly enclosed within the principal feeding path 18. The second path may serve to convey web-type records composed of a series of connected documents forming a manifold journal which is successively unfolded from a supply bin 50 and lead around the path 48 to the receiving bin 52. At the platen 22 of the printer the inner path 48 is confluent with the outer path 18, as is evident in FIG. 2. This enables the printer to impress the data simultaneously on a stopped ledger card and on the journal record. Another feature of the processor unit is the provision of an auxiliary stacking bin or receptacle 54 at the top of the front side thereof and above the line selecting mechanism 24. By an auxiliary feed path 56 joined to the principal feed path 18 rearwardly of the line selecting device and by the provision of a gate at such juncture, certain selected cards flowing through the transport system may be deflected into the stacking bin 54.

The selective means in FIGS. 4 to 8 illustrate in sequential manner the operation of the line selecting mechanism and will serve to show several important operating features of the invention. Referring now to these figures and also to FIG. 3, the sheet items or ledges are moved by opposed pairs of rollers 58 and 74 of the transport mechanism in a generally upward direction so as to come between a row of type carriers 60 containing character printing type slugs 62 and the platen 22 of the printing mechanism 20. The roller pairs are arranged to engage one side marginal portion of the record members, in this instance the left margin of the members as is evident in FIG. 3, leaving the central portion and right margin free of gripping elements. The sheet items are advanced along a generally vertical path above the printing platen 22 and may be registered with respect to the printing platen by means of spaced apart blocking tabs or abutments 64 and 66 which are mounted for movement in an orbital path. The path of the abutments coincide with the path of movement of the record sheets for a portion of its length. For accomplishing the orbital movement, the tabs are shown as fixed in projecting relation to the outer surface of an endless web or belt 68 which is mounted for movement upon pulleys 70 and 72, the two tabs being equally spaced about the periphery of the belt. At least one of the pulleys serves to provide constant driving torque for moving the belt 68, and for the purpose of providing close accurate movement of the belt it is preferred to provide internal transverse ribs on the belt and mesh such ribs with flutes or ribs on the pulleys as more clearly shown in FIG. 9. The endless belt 68 is positioned adjacent to the path of movement of the record sheets in the line selecting mechanism and such that one portion thereof travels in close parallel relation to the transport path so as to separately project the tabs thereinto.

As will be described more fully hereinafter, the endless belt 68 is capable of being moved to advance one or the other tabs into and along the sheet transport path and to stop the tab at a predetermined position representing a paricular printing line on the sheet which it blocks in the path. A plural number of such tab stopping positions are provided. In the embodiment of the invention illustrated herein fifty such positions representing fifty different printing lines on each sheet are provided. Every tenth such position commencing with the first line as shown in FIG. 4, by the lines designated A, B, C, D, E and F and representing respectively the 1st, 10th, 20th, 30th, 40th and 50th printing lines of each sheet.

Figures 7, 8:
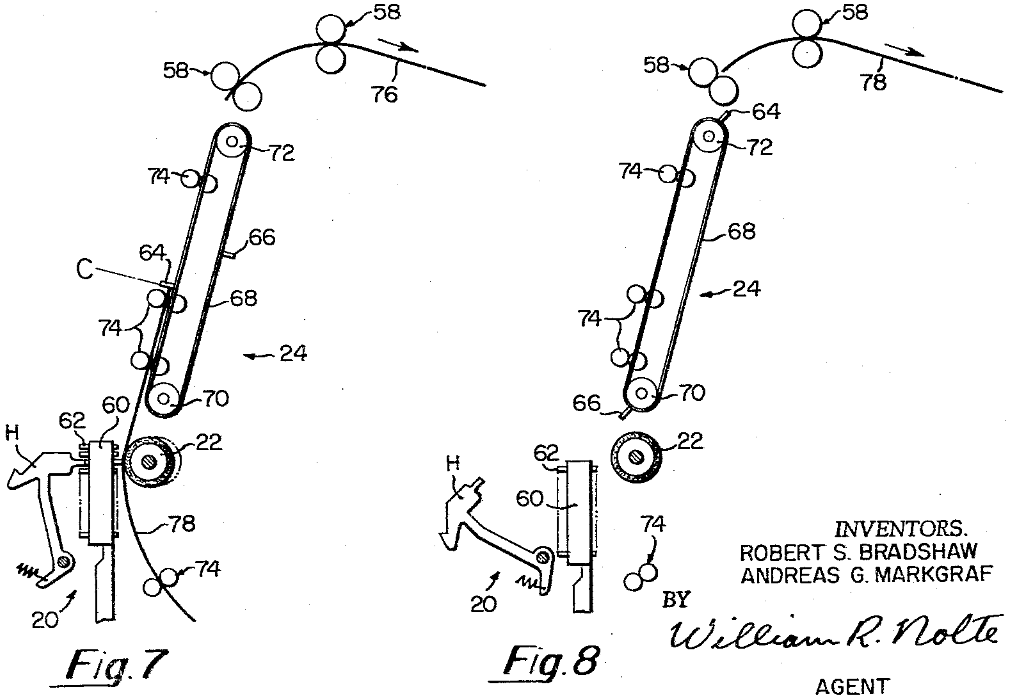

The tabs or abutments on the endless belt when the latter is in its "home" or free flow position as shown in FIGS. 4 and 5 are free from the path of movement of the record sheets enabling the sheets to be advanced uninterruptedly through the line selecting mechanism by several pairs of opposing driving rollers 74—74 acting on one of the margins of the sheets as previously mentioned. FIG. 4 shows one sheet or ledger 76 arriving at the printer, while FIG. 5 shows the same sheet passing through the line selecting mechanism and the succeeding sheet 78 arriving at the printer. When, however, as shown in FIG. 6, it is desired to stop a particular record sheet such as ledger 78, in accordance with sheet positioning information furnished to the mechanism, a torque is applied through belt pulley 72 to advance the belt 68 so that one of the abutments, such as tab 64, is interposed between the trailing edge of a preceding record sheet 76 passing through the device and the leading edge of the selected sheet 78. With reference to FIG. 7 the endless belt 68 has carried the tab 64 into and along the path of the ledger sheets and has stopped it at a selected position such as the 20th line position as indicated in FIG. 7 where it is effective to thereby obstruct the further passage of the sheet along its path as indicated by the abutment of sheet 78 thereagainst.

When so stopped, the individual record sheet 78 is positioned so that the selected printing line, usually the first vacant one, lies opposite the platen 22 which is then moved theretoward from its open dotted line position to its closed full line position in FIG. 7. Upon the completion of this platen movement, one or more type carriers are raised to predispose a selected typing slug in printing position and associated hammers H of the printer strike appropriate slugs in the type carriers to record new visual data on the stopped record sheet. After completion of the printing operations, which may involve single line indexing of the stopped sheet 78 to immediately successive posting lines to be described more fully hereinafter, and wherein the platen 22 closes and opens with every print cycle, the torque which is always present moves the belt 68 when it is released by its associated control devices in the direction of feed of the ledgers. The abutments 64 and 66 thus move to their alternate "home" positions while at the same time the rollers 74—74 accelerate the stopped sheet 78 to transport velocity and eject the sheet from the printer and line selecting mechanism as illustrated in FIG. 8.

During the previously described posting operations while the sheet 78 is held stationary by the abutment 64 the frictionally driven feed rollers 74 are adapted to slip at a predetermined frictional level but because of the driving torque applied thereto continuously urges the stopped sheet upwardly against the registering abutment 64 to thereby align the desired print receiving line with the platen. After the aforementioned ejection of the sheet 78 from the device, it is observed that in FIG. 8 the other abutment 66 now occupies the position assumed by abutment 64 at the start of the posting cycle in FIG. 4, and the mechanism is thus positioned for a new posting cycle. By providing the second abutment 66 on the belt 68 the time required for a complete cycle of the line find belt is halved in that the abutment 64 need not be returned to its original home position to start the next posting cycle.

The principal structural and operating features of a line selecting mechanism embodying the invention are brought out by the schematic showing in FIG. 3. There it is to be noted that the sheet positioning belt 68 is arranged to operate alongside of the several pairs of sheet advancing rollers 74—74 and in association with a pair of opposed closely spaced parallel plates 80 and 82. The two plates 80 and 82 are shown as rising substantially vertically above the platen 22 of the printer 20 and the space between the two plates is left unobstructed, except for the action of the stopping tabs 64 and 66, to form a guideway through the line selecting mechanism constituting a continuation of the sheet transport path 18 through the printer. When it is desired to have the printing on the sheets or ledgers exposed to view the plate 80 which overlies the front side of the sheet may be composed of transparent material. The belt 68 is mounted so that one section thereof passes close to the space between the plates so as to carry the sheet stopping tabs thereinto and along the guideway provided by the plates. For this purpose the belt may be located behind the back plate 82 and the latter provided with an elongated slot 83 receiving the adjacent section thereof, all of which will be brought out more clearly in connection with FIG. 18.

The torque for driving the aforementioned pairs of transport rollers 58 and 74 and the pulleys 70 and 72 of endless belt 68 is derived from a source of motive power such as the motor M shown in the upper left hand portion of the drawings. A series of belts 86, 88, 90, 92, 94 and 96 suitably interconnected with one another and the output shaft 100 of the motor serve to drive the transport rollers associated with the line selection mechanism. A pulley 102 affixed on the power shaft drives belt 104 which in turn through pulley 106 drives an upper shaft generally indicated at 108 to drive the upper pulley 72 of the sheet positioning belt 68. Upper shaft 108 is divided into two portions identified as 110 and 112 which are connected through a friction clutch 114. The clutch 114 will permit shaft portion 110 to continue to rotate relative to shaft portion 112 when the line selecting belt 68 is arrested from movement in a manner to be presently described. The left hand shaft portion 110 by means of pulley 116 affixed thereto and endless drive belt 118, operates through pulley 120 to rotatingly drive a lower transverse left-half shaft 122. A friction clutch 124 which may be similar to the previously described clutch 114 is disposed between pulley 120 and the shaft 122 and applies a constant torque to the latter to rotate the same in a clockwise direction, as indicated by the arrow encircling the same. The clutch, however, will allow stoppage of the shaft 122 while torque is continued to be applied by the pulley 120.

Control means responsive to external signals is provided for moving and stopping the sheet positioning belt 68 and thereby locating one or the other of the tabs 64 and 66 at any one of the printing line positions referred to hereinabove in connection with FIGS. 4 to 8. Such control means, which is generally indicated at 126 in FIG. 3, operates to permutably control the rotation of the two lower aligned shafts 122 and 128 and is illustrated herein as in the form of a differential gear mechanism including a separate series of control devices associated with each of the gears of the differential mechanism for limiting the rotation thereof.

The differential gear mechanism of the control 126 includes a pair of spaced, opposed bevel gears 130 and 132 and a meshing rotatable spider gear 134. As shown in FIG. 3*a* the opposed gear 130 is pinned as at 131 to half shaft 122, while the opposed bevelled gear of the differential 132 is rotatably journalled on shaft 128 as by bearings 133. The spider gear 134 is schematically shown as both carried by and journalled on the inner extremity of shaft 128 by providing a right angle bent arm extension 129 to the shaft as best shown in FIG. 3*a*. The spider gear is thus capable of bodily revolving about the axis of shaft 128 and rotating about its own axis as provided by bearings 135. The lower pulley 70 of the sheet positioning belt 68 is affixed to shaft 128 at the end opposite that of arm 129, and any rotation of shaft 128 will be reflected in a corresponding advancement of the tabs or abutments 64 and 66 on the sheet positioning belt 68. During the operation of the device, constant torque is applied to the shaft 128 by way of the splined pulley 70, sheet positioning belt 68 and upper splined pulley 72, the last receiving its driving torque through friction clutch 114 as previously described.

The rotation of shaft 128 from a partial turn to a number of full turns, and hence the advancement of sheet positioning belt 68, is controlled by the rotation of the oppositely facing bevelled gears 130 and 132 of the differential gear mechanism 126. The control of bevel gear 130 corresponds to the "units" incremental advancement of the belt and for this purpose there is provided ten solenoid actuated stopping devices 140—149 which are equi-angularly disposed about the shaft 122, one solenoid of which, specifically solenoid 140 for the zero position, is shown in FIG. 3, the remaining solenoid devices being omitted from this figure for the purpose of clarity. However, the remaining solenoid devices for the incremental positions "one" to "nine" are represented in FIG. 3 by radial lines equally spaced about the shaft 122. For a detailed showing of the physical arrangement and mounting of the solenoids and their associated operating elements, attention is called to FIG. 24.

Each solenoid stopping device 140—149 includes a clapper 152 which may be suitably hinged to coact in interlocking engagement with bell crank 154 to rock the latter about its pivot axis 156. By suitably energizing one of the "units" solenoids 140—149, inclusive, its associated bell crank may be rocked into a position to serve as a stop for a projecting finger 158 which is jointly rotatable with the shaft 122 to thereby arrest the shaft in one of its ten possible "units" positions. The belt 68 is permitted to move through the interaction of the three bevel gears 130, 132 and 134. Upon the release of a "homing" stop as will be described later, bevel gear 130 will rotate until the finger 158 is arrested by a selected "units" solenoid and will be permitted to move. After bevel gear 130 is arrested spider gear 134, which is in mesh therewith, causes bevel gear 132 to rotate at twice the velocity until it is stopped by provision hereinafter described. With both bevel gears 130 and 132 stopped, the spider gear 134 is stopped along with shaft 128 and hence pulley 70 and the line find belt 68 will be likewise stopped.

Control of bevel gear 132, which faces opposite to differential gear 130, controls the magnitude of the "tens" rotation which can be imparted to the sheet positioning belt 68. The number of revolutions of bevel gear 132, of which each revolution corresponds to ten printing line spaces on a document such as the bank ledger illustrated in FIG. 3*b*, is limited by the number of signal controlled devices associated with the bevel gear and a fixed terminal stop. In the schematic view in FIG. 3, these devices are arranged in a row along shaft 128, and are generally designated by reference characters 170, 175, 180, 185 and 190. The first device 170 includes a disk-like body portion 171, which as shown in FIG. 3*a* is jointly rotatable with the bevel gear 132, and an elbow portion extending laterally from the periphery thereof designated by reference character 172, see FIG. 9. The elbow portion is notched at 173 along its upper edge adjacent the free end thereof. In a similar manner, control device 175 includes a disk-like body portion 176 rotatably journalled on shaft 128 and provided with a laterally projecting elbow portion 177 having both an upper and lower notch 178 and 179 respectively at opposite ends of the elbow.

Control devices 180 and 185 are identical with control device 175. Like the latter, each includes a disk element rotatably journalled on shaft 128, an elbow, and corner notches in the opposite ends of the elbow. For control device 180 these are designated with reference characters 181, 182, 183 and 184, respectively, and for control device 185 by reference characters 186, 187, 188, 189, respectively. The last control device 190, while similar, merely includes an unbent arm 192 projecting outwardly from the disk 191 and lying in the same plane.

The arm 192 is notched as at 193 to receive the elbow portion 187 of the adjacent disk 185 in a manner described hereinafter. The first disk element 170 is jointly rotatable with the bevel gear 134 and the two may form an integral part of a sleeve 174 journalled by bearings 133 for rotation on shaft 128 as shown in FIG. 3*a*. The remaining disk elements are so associated with the bevel gear that their corresponding elbow portions extend in a manner to engage the next successive element with each revolution of the bevel gear. The number of revolutions which the bevel gear 134 may make is dependent upon which of the disk elements in the series is arrested. For this purpose the control devices also include a series of signal controlled instrumentalities in the form of solenoids 200, 205, 210, 215 which are individually associated respectively with the disk elements 170, 175, 180 and 185 for limiting the extent of their rotation. A fixed stop 220 is provided for limiting the rotation of the last disk element 190. Thus, the stopping solenoid 200 is adapted to arrest disk element 170; solenoid 205 to arrest disk 175, etc. The solenoids 200, 205, 210 and 215 are similar in function to the previously described stopping solenoid device 140 and each has associated therewith an actuatable rockable bell crank identified respectively at 201, 206, 211 and 216. The aforementioned disk element 190, in addition to having the fixed stopping element 220, includes a home stop element 195 which limits the return motion of the last disk 190 of the series.

Shaft 128 has integrally fixed thereon gear 225 which meshes with a larger gear 227 which is splined to shaft 229. The latter shaft also carries a projection 231 which can be arrested during its rotative movement by the interposition of a clapper 235 forming part of solenoid actuated stopping device 234, FIGS. 3, 9. One revolution of gear 227 corresponds to one cycle of operation of the sheet positioning belt 68 which constitutes a movement interchanging the positions of "home" positions of the abutments 64 and 66. Thus, one rotation of the sheet positioning belt is equivalent to two cycles of operation of the aparatus. To begin an operation an initiating pulse must be applied to release solenoid 234 to cause its associated clapper 235 to move out of the path of stop 231 and to thereby enable the shaft 128 to be moved by the previously described drive means to commence a cycle of operation.

Figures 9, 10, 11:
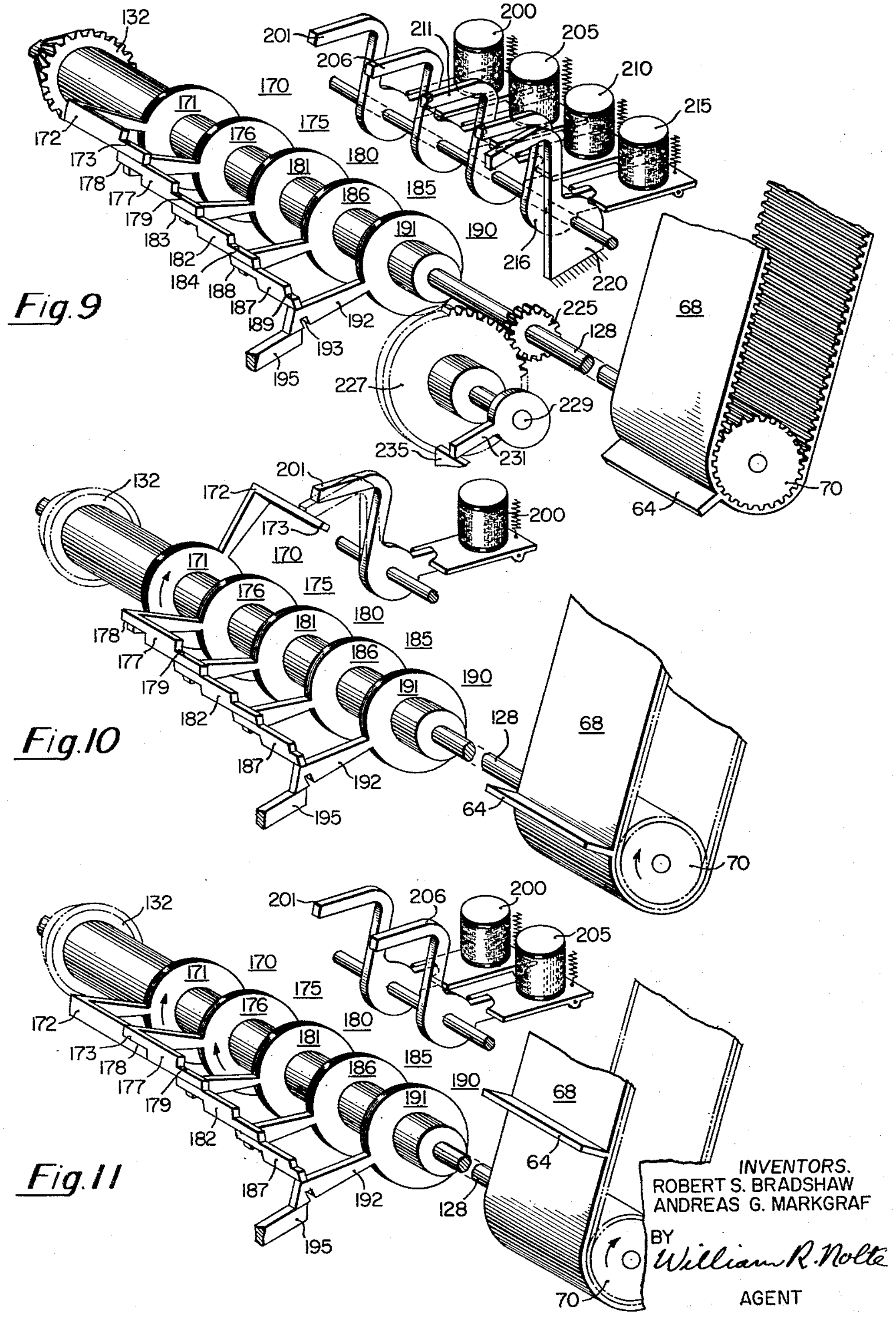

When an enabling pulse has been applied to commence such a cycle, the rotation of bevel gear 132 will correspond to the direction of the arrow shown in FIG. 10. It will be recalled that disk element 170 is integral with the aforementioned bevel gear. The bell crank 201, if moved to its phantom line position as shown in FIG. 10, upon suitable energization of solenoid 200, will arrest the rotative movement of disk 171 and hence bevel gear 134 in the position illustrated in FIG. 10. As previously described, the belt 68 is allowed to move through the interaction of the three bevel gears 130, 132 and 134. With bevel gear 130 fixed, energization of the homing solenoid 234 allows shaft 128 and spider gear 134 to commence movement. Because the latter is in mesh with gear 130, rotation of shaft 128 causes bevel gear 132 and associated disk 171 to rotate at twice the velocity until it is stopped by bell crank 201. With both bevel gears 130 and 132 stopped, the spider gear 134 is likewise stopped along with shaft 128, and therefore pulley 70, causes the abutment 64 to assume the position shown in FIG. 10. The position of the abutment shown in FIG. 9 corresponds to that shown in FIGS. 4 and 5, while the further movement of the abutment to the position shown in FIG. 10 corresponds to that shown in FIG. 6 in which the abutment has been introduced into the path of movement of the ledger sheets and is in its "0" line position where it is capable of stopping a ledger at its first printing line thereon. The sole purpose of disk 170 may therefore be stated as being to provide the angular movement of the abutment from its inactive "home" position on the curved portion of the belt, see FIG. 4, to a sheet blocking position within the guideway of the line selecting mechanism and at a position representing the zero line printing position as shown in FIG. 6.

Thereafter, if the bevel gear 132 is permitted to rotate

360°, or make a complete revolution, such a revolution will correspond to ten line spaces on the document which is to be stopped. This can now be followed by referring to FIGS. 10, 11 and 12. Referring first to FIG. 10, the elbow of disk element 170 is shown coacting with bell crank 201, the latter being in a phantom position. If, however, the bell crank is moved to its normal or full line position, rotative power may be exerted through the belt 68, right hand shaft 128, spider gear 134 to react against bevel gear 130 and thereby rotate bevel gear 132 which carries disk 170. Thus rotation will continue to proceed until the elbow 172 of the disk rotates in the direction of the arrow shown in FIG. 10, until such time as it comes up under and engages the next successive elbow 177 of disk 175, as shown in FIG. 11 and picks it up for continued rotation therewith. This rotative motion will continue to the position shown in FIG. 12 where, since solenoid 205 has been signalled its bell crank 211 has been moved to the phantom where it will stop the rotation of the elbow 177 of the second disk 175. It is now observed that the abutment 64 has moved from the "0" position shown in FIG. 10 to an advanced position in FIG. 12, ten spaces removed from the "0" position.

If the record sheet is to be stopped at a line which includes at least two multiples of ten, for example, the 20th printing line, then the bell crank 211 would assume its retracted normal or full line position shown enabling the elbow 177 to rotate therebeyond and come up under the next successive disk element 180. The bevel gear 132, through its disk element 170 coacting with the second disk element 175, would continue to rotate until the position shown in FIG. 13, where the third disk element 180 would be picked up. Thereafter the bevel gear and the three disk elements 170, 175 and 180 would all rotate in unison about the axis of shaft 128 to the position shown in FIG. 14 where the elbow portion 182 of the disk 180 is shown as being arrested by bell crank 211 associated with solenoid 210, this solenoid being signalled to interpose its crank arm 211 for this purpose. In this position the abutment 64 on the sheet positioning belt has now moved to its 20th space or a second increment of 10 spaces over and above that shown in FIG. 12.

Figures 12, 13, 14:
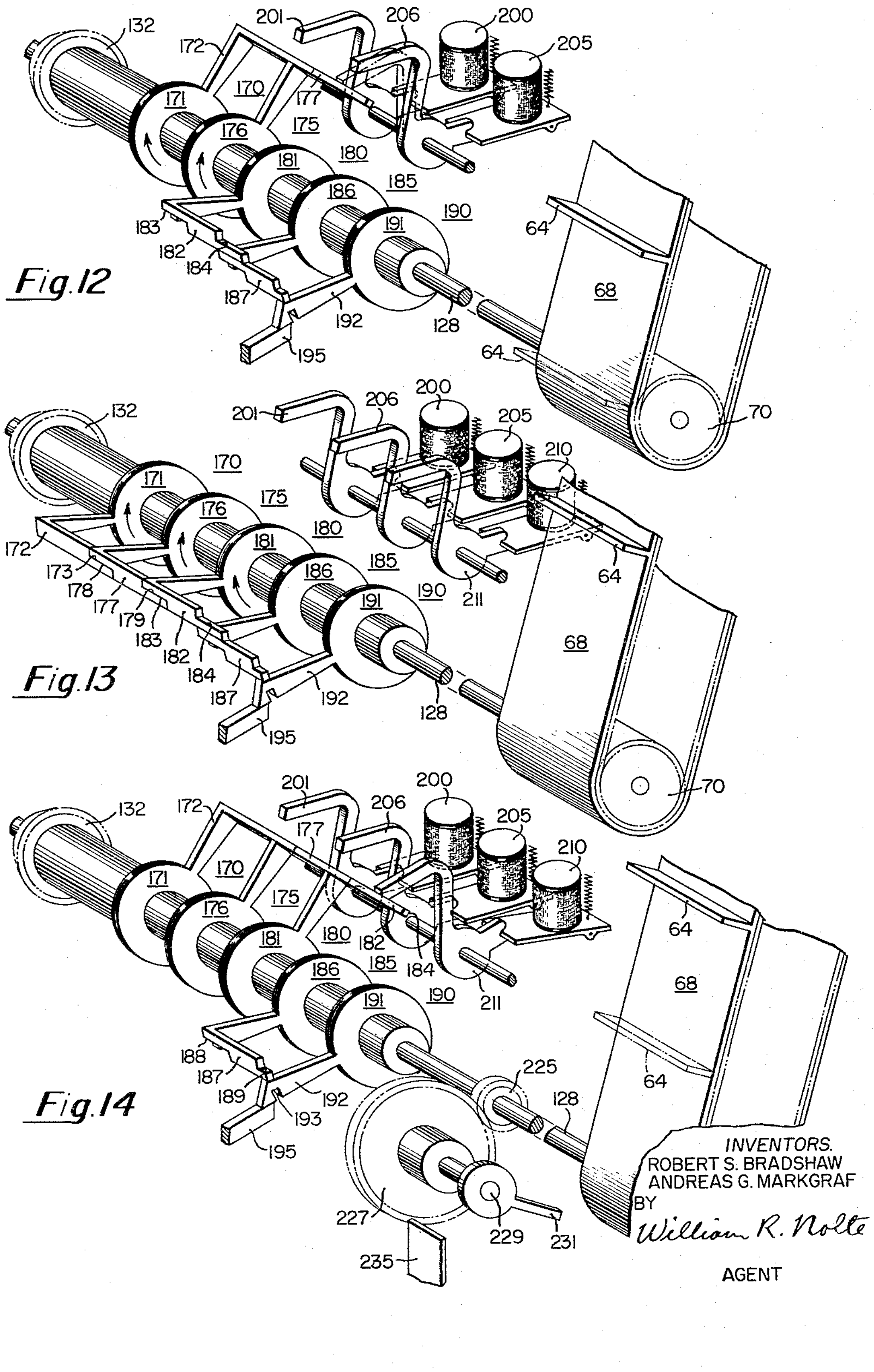

In a similar manner, if three multiples of ten exist in the number corresponding to the line on which the record is to be stopped, then the three preceding disk elements 170, 175 and 180 will rotate beyond the position shown in FIG. 14 until such time as they pick up the arm of the fourth disk identified as 185 and thereafter move it so that the same may be arrested by bell crank 216 of associated solenoid 215. If so arrested, the sheet blocking abutment 64 will be moved to the 30th line position. It will, of course, be understood moreover that in any given line position the "units" side of the differential will likewise permit single incremental line spaces of movement up to nine. Thus, in a document which is destined to be stopped at line 35 the "units" solenoid 145, not shown in FIG. 3, however see FIG. 24, but identified by the radial line "5" in FIG. 3, will arrest the "units" shaft 122. The sheet positioning belt 68 will thus be permitted to move five individual lines. In addition, since ten is divisible three time in the number 35, the solenoid 215 should be actuated and thus provide thirty additional printing lines beyond that of the five provided by the "units" solenoid 145 to thereby arrest one of the abutments 64 or 66 in the guideway of the line selecting mechanism corresponding to the 35th printing line of the document stopped by the abutment.

The last disk 190 limits the rotation of bevel gear 134 to its fourth revolution. Thus, if the disks 170, 175, 180 are rotated in unison to pick up disk 185 and all four disks 170, 175, 180 and 185 are thereafter rotated to pick up the arm 192 of the fifth disk 190, the five disks are then rotated so that the arm 192 is engaged by the fixed stop 220, see FIG. 15, then the sheet positioning belt will have moved through 40 line spaces. In doing so, the notched portion 189 of the elbow 187 of the fourth disk 185 will have been received in the notch 193 of arm 192 of disk 190. In general, the maximum size of the record sheet which is to be handled by the illustrated mechanism is such that space limitations on the record sheet in depth do not exceed 50 lines. Thus, four ten line increments, plus the permissible "unit" increments of movement are sufficient to position the record sheet of such dimension so that any line thereon between zero and fifty may be presented for the impression of data thereon such as by the associated printing mechanism 20. Note that in this latter example in which the record is stopped beyond line forty that none of the solenoids 200, 205, 210 or 215 need be energized to actuate their respective bell cranks.

Referring to FIG. 3*a* the various combinations of control over the differential gear mechanism 126 which limits the output of shaft 128 and hence the positioning of the line find belt 68 are as follows: A first relationship exists in which the differential gear 132 is arrested and wherein bevel gear 130 is free to rotate. A second relationship exists wherein gear 130 is restrained against rotation and bevel gear 132 is free to rotate its full limit until finally stopped by the fixed abutment 220. A third relationship exists in which the bevel gear 132 is rotated in a counter direction relative to bevel gear 130 to restore the rotation limiting disk elements 170, 175, 180, 185 and 190 to their home positions.

Considering the first relationship in which differential bevel gear 132 is arrested and wherein the bevel gear 130 is free to rotate by virtue of the torque applied to it, the spider gear 134 will be driven by 130 and caused to rotate about its own axis while walking around the periphery of the arrested bevel gear 132 to thereby cause shaft 128 to rotate and to simultaneously advance the position selecting belt 68. The extent of rotation of the bevel gear 130 and the further extent to which it drives the spider and hence shaft 128 is obviously governed by the selection of the units solenoid 140–149, inclusive.

Figures 15, 16, 17:
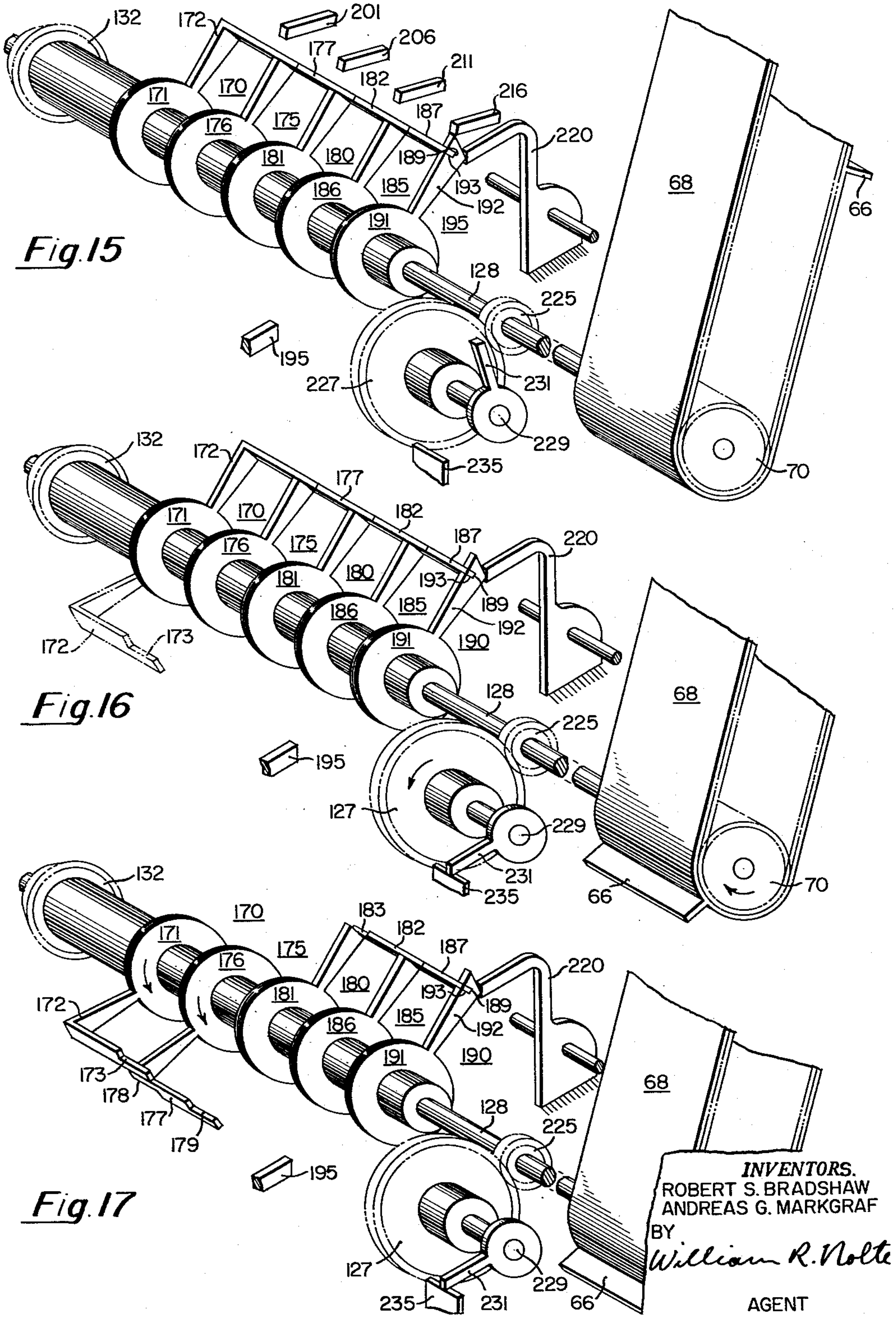

The second relationship occurs when bevel gear 130 is arrested by one of the units stopping means 140–149, inclusive, associated therewith and one or none of the corresponding tens level solenoids 200, 205, 210, 215 associated with the bevel gear 132 is energized to interpose its crank arm. Since torque is applied to shaft 128 by means of the sheet positioning belt 68, shaft 128 revolves, therefore spider gear 134 bodily revolves around the axis of shaft 128 with arm 129. This action of spider gear 134 against arrested gear 130 causes spider gear 134 to walk around gear 130 turning on its journals on arm 129. This turning action of gear 134 on its own journals causes bevel gear 132 to rotate. As is evident in FIG. 10 bevel gear 132 rotates until one of the arms 172, 177, 182 or 187 abuts its respective solenoid actuated crank arm or until the last disk 190 is arrested by fixed stop 220 if no crank arm is actuated to stop position. In any event, the arm 172 of the first disk element 170 picks up arm 177 of the next successive disk 175 and the two disks will rotate in unison. Thus rotation of bevel gear 132 will continue, until stopped by interposition of a crank arm, until the next successive disks 180, 185 and 190 are similarly picked up and driven by bevel gear 132 and until the arm 192 of the last disk 190 abuts the fixed stop 220, as seen in FIG. 15. When so arrested both clutches 114 and 124 will slip as the sheet positioning belt is arrested.

A third differential condition arises as follows: After a printing operation has been completed on a given record sheet those solenoid devices actuated to stopping positions associated with either bevel gear 130 or 132, singly or in combination, will now be released from their holding positions to permit the belt 68 to move to a "home" position thus enabling the frictionally driven rollers 74 to eject the record sheet from the mechanism. The shaft 128, FIGS. 15, 16, will rotate in the same direction as previously indicated until the reset gear 227 completes its full revolution bringing fixed stop 231 against clapper 235 of solenoid stopping mechanism 234. This will lock shaft 128 against further rotation. Since a clockwise torque is also simultaneously being applied to shaft 122, refer to FIG. 3*a*, the bevel gear 130 will cause spider gear 134 to rotate on its axis in the direction of the arrow as indicated in FIG. 3*a* and will thus produce a counterclockwise rotation of bevel gear 132. Thus the disk element 170 associated integrally with bevel gear 132 will be disengaged from the next adjacent disk 175 as shown by the phantom line position of elbow 171, FIG. 16, and rotated a complete revolution thereof, to engage the same on its opposite surface thereof. Another complete counter revolution of bevel gear 130 will cause the next elbow 177 of disk 175 to engage elbow 182 of disk 180 which will thereafter move in unison with disks 170, 175, FIG. 17. Each next counter revolution of the bevel gear 132 will in a similar manner pick up and rotate the next successive disks until all of the disks are aligned as shown in FIG. 9 for the start of a new posting cycle. It is thus apparent that although torque is continuously applied in one direction to the left differential shaft 122, it is capable of reversing the rotation of the disk elements of the control devices 170, 175, 180, 185 and 190 and resetting them to zero starting position shown in FIG. 9.

An important feature inherent in the apparatus of the present invention permits single line indexing of a ledger through more than ten lines without affecting the initial setting of the "tens" control units applied during the initial printing cycle. This involves the situation wherein a ledger may be arrested at a given line position and thereafter advanced a single line at a time up to and through more than ten successive single line increments of spacing without affecting the "tens" solenoid setting which has been initially applied to arrest the document at its first selected line position. Thus by way of example assume that the ledger was initially arrested at its 14th line, and that it was required to print on the next twelve successive lines. In this example the first line at which the ledger would be arrested would correspond to its 14th printing line thereon. To so arrest the ledger, the "units" solenoid 144 located on the 4th radial line extending from the axis of shaft 122 will have been energized and its clapper will have arrested the finger 158 carried by the shaft 122. On the "tens" side, solenoid 205 will have been energized to engage the elbow 177 of disk 176 as seen in FIG. 12. After this initial printing operation has been completed with respect to the 14th line on the ledger, the next solenoid 145 will be energized to interpose its clapper in the path of movement of the finger 158 to stop the shaft 122 and the units solenoid 144 deenergized to free the shaft to allow the line find belt 68 to step the ledger one printing line so that the 15th line thereof is presented for a printing operation. Thereafter solenoid 146 is energized and solenoid 145 deenergized to present the 16th line for a printing cycle, etc. This successive single line advancement may be continued until the solenoid 145 is again reached and thereafter the entire previously described sequence may continue until the 50th line position is reached. The rotation of shaft 122 as permitted by the solenoids 140 to 149 inclusive is thus completely independent of the arrested position on bevel gear 132 and the above single line advancement may be continued through the remaining portion of the cycle of the sheet positioning belt at which time shaft 128 will have rotated until the reset gear 227 has completed a full rotation and is arrested by stop 231 of "homing" solenoid 234, the operation of the latter having been previously described.

As previously mentioned the record sheets L in addition to having visual information recorded on the front face of the documents may also include coded data representative of such visual information which is contained in magnetic stripes on the reverse side of the record sheets. This may be seen in FIG. 39. Certain of the magnetic coded data so illustrated constitutes line select data. By way of example, the ledger sheet illustrated in FIG. 39 includes thirteen lines of printed matter on its front face and therefore the data encoded on the magnetic stripes on the reverse side would be such as to call for the ledger to be stopped by the line selecting mechanism of this invention at its 14th line to receive new visual printed data on its front face. Before reaching the line selecting mechanism the data contained in the magnetic stripes is read during the passage of the record sheet on which it is contained through guiding ribs 240, 242 of the sheet transport mechanism illustrated in the lower right hand corner of FIG. 3. For this purpose magnetic reading heads 244, 246 are disposed adjacent the guideway. The magnetic data sensed by the reading heads when properly processed by the control unit 11—such as illustrated in FIGS. 1 and 2—is capable of delivering energizing electrical signals to one of the previously described "units" level solenoids identified by reference characters 140—149 and a corresponding one of the "tens" level solenoids 200, 205, 210 and 215 so as to permutably energize the same. In the present example, since the illustrated ledger sheet of FIG. 3*b* is to be stopped at the 14th line, the number four "units" solenoid 144 and the "tens" solenoid 205 would be energized in a manner to arrest the line find belt so that the 14th line on the sheet would be presented opposite the platen of the printer. After the ledger sheet has undergone posting operations the sheet will be ejected in the manner as described previously and will during the course of such ejection have the magnetic data on these stripes updated to correspond to the new visual data which has been recorded on the front face thereof. For this purpose magnetic write heads 248 and 250 are provided to update the coded data in the stripes on the reverse surface of the sheets and a second pair of sensing heads 249, 251 may be provided for checking purposes.

Means generally designated by reference character 252 is provided and associated with the line selecting apparatus for the purpose of indicating the position at which the line select apparatus was stopped. For this purpose a read-out device is provided whose function is to read out the line position in which the ledger was actually stopped to enable the write heads 248, 250 located above the line find apparatus to record new line find data or information on the aforementioned magnetic stripes. The read-out device 252 relates to apparatus of the type described and claimed in the copending application for patents of Lessig et al., entitled, "Read-Out Apparatus for Line Selection Mechanism," Serial No. 5,733, filed February 1, 1960, and assigned to the same assignee as the present application. Another primary function of the read-out device is to sense when a particular ledger sheet has been filled with printing on its front face thereof. This information might then be used to call for a new ledger. A third function of the read-out device may involve advancing or indexing the record sheet or ledger a line at a time. This would correspond to recording successively lines of visual information on the front face of the record sheet. Thus the read-out device is provided to determine the single step line by line advance of the line selecting apparatus.

The read-out device utilized with the illustrated embodiment of the invention employs optical principles together with mechanical elements, one of which is responsive to the movement of the sheet positioning belt 68. The read-out device is capable of converting the motion of the belt from decimal notation to binary notation.

As shown in the upper left hand portion of FIG. 3 the optical read-out device 252 is shown as including a rotatable drum 254 which is open at one end and is attached at its other closed end to a shaft 256. A gear 258 affixed to the shaft of that of the drum receives power from a gear 262 affixed to shaft 112 which drives the upper pulley 72 of the line find belt 68. The drum includes a coding of holes in its periphery which may be similar to punched tape, and may be in binary form. Enclosing the drum is a housing 264 having a fixed set of holes therein. As the drum is rotated relative to the fixed housing light by means of a light source 266 is allowed to pass through the fixed holes in the outer housing and through certain of the holes into the drum so that the light may enter the center portion of the drum. A fixture 268 adapted to hold a plurality of photo diodes or corresponding light photo-sensitive elements is positioned to receive light which may pass through certain of the apertures in the coded drum which at any given instant may be aligned with the holes in the fixed housing outside the drum. Thus the rotation of the 254 coded drum produces a shutter effect allowing light to fall on certain of the light photo-responsive elements housed on the fixture. The rotation of the code drum is directly coupled to the movement of the line selecting belt so as to be capable of indicating each successive position attained by the line-find belt. The various combinations of holes are so presented relative to the photo-sensitive units as to represent such particular position to which the abutments on the endless belt are advanced.

Referring now to FIGS. 18 to 38 inclusive, a preferred embodiment of the invention incorporates structural features shown in the schematic views of FIGS. 3 to 17. Where practical, like reference characters employed in the schematic view have been carried over and used in the structural embodiment illustrated in the latter figures. Attention is now called to the similarity between FIGS. 3 and 18. The upper left portions of each figure show devices for applying rotation for causing the ledger sheets to be moved in a generally upward direction so as to come between the type carriers 60 and the platen 22 of the printing mechanism 20, and between the spaced apart pair of front and back plates 80 and 82, respectively, forming a sheet feeding guideway therebetween. A plurality of sets of feed rollers 74 are mounted along a side portion of the feeding path defined by the plates to advance a ledger sheet either completely through the line selecting mechanism or into engagement with one or the other of the tabs or abutments 64 or 66 when introduced into and stopped along the pathway. As in FIG. 3, the tabs are carried by the endless belt 68 and are equally spaced apart from one another thereon.

Similar to the schematic view in FIG. 3, the belt 68 is mounted for movement on upper and lower pulleys 72 and 70 respectively and the upper driving pulley 72 receives its power from upper shaft generally indicated at 108 which is divided into two aligned portions 110 and 112 connected by clutch 114. The aforementioned sets of sheet feeding rollers 74 receive their rotative power from a series of endless belts 86, 88 and 90, as shown and described in connection with FIG. 3. The read-out device 252 is shown in FIG. 18 as having its drive shaft 256 connected through gearing to shaft portion 112.

The control means for moving and stopping the sheet positioning belt 68 generally designated by reference character 126 in both FIGS. 3 and 18, and in the structural embodiment of FIGS. 18 to 38 is contained within a housing 270 shown in the lower left portion of FIG. 18. Rotative power is delivered from the upper transverse shaft 108 through belt 118 to clutch device 124. The latter applies a constant torque to the half shaft 122 of the control device 126. The interaction of the three bevel gears 130, 132 and 134, shown in dotted outline in FIG. 18, controls the rotation of the output shaft 128 which is connected to lower pulley 70 and thus controls the extent of movement of the sheet positioning belt 68.

The control mechanism 126 in its preferred form is best seen in FIGS. 23 to 28 inclusive. Within the housing 270 there is provided an inner casting plate 272 and outer frame plates 274 and 276 disposed on opposite sides thereof which support the various internal elements of the mechanism therebetween. See in particular FIG. 25. The left transverse half shaft 122 is mounted for rotation, relative to inner plate 272 and outer plate 274, by sets of bearings 277 and 278, the latter set being received in housing 280 and mounted in side plate 274. Equally angularly spaced about the axis of shaft 122 are the ten "units" control devices 140 to 149 inclusive, each comprising a solenoid 151, clapper 152 and a rockable bell crank 154 interengaging its associated clapper, see FIG. 23. Ten rods 282 equally circularly spaced around the half shaft 122 support the left side plate 274 in rigid spaced relationship with respect to internal plate 272 and each rod moreover provides a pivotal mounting for its corresponding bell crank 154.

Spacer elements 284 and 286 disposed on opposite sides of the bell cranks 154 position the ten bell cranks in two planes normal to the axis of the half shaft 122. As described in connection with FIG. 3 the stop element 158 is jointly rotatable with shaft 122 and for this purpose it is pinned at 159 thereto and includes a finger portion of sufficient width to be alternately engageable by the bell cranks mounted in the two planes as is evident in FIG. 25. Correspondingly, the previously mentioned solenoids 140—149 are so disposed relative to their respective bell cranks so as to likewise lie in alternately staggered relation in the two parallel planes. For this purpose a plurality of blocks 288 and 290 of two different heights are alternately affixed to the internal plate 272 to provide mounting support for the corresponding solenoid brackets 292 which in turn are secured to the blocks such as by screws 294.

As shown in FIGS. 25 and 27, the "tens" control devices 170, 175, 180, 185 and 190 are disposed along the right transverse half shaft 128, the latter shaft being coaxially aligned with the left half shaft 122. Moreover, the bevel gear 130 affixed to shaft 122 includes an internal bore portion 296 which receives the left end portion of the transverse shaft 128. The opposite or outer end of shaft 128 is journalled for rotation in side plate 276 by bearings 277 and extends therebeyond to carry the lower pulley 70 on which the sheet positioning belt 68 is sheaved. A rectangular block 298 between bevel gears 130 and 132 is pinned as at 300 to the inner end of shaft 128 and carries spider gear 134 which is journalled for rotation about stub shaft 302 in the block 298 by bearings 304. The latter described block mounting for the spider gear 134 corresponds to the right angularly bent arm portion 129 shown in FIGS. 3 and 3*a*. As described in connection with FIGS. 3 and 3*a* the right bevel gear 132 is journalled for rotation about half shaft 128. Instead of the bevel gear 132 directly carrying the first disk element 171, as in FIG. 3, the latter is a separate sleeve like element 171 journalled on the shaft 128 and interlocked with the bevel gear for joint rotation as by key 171'.

Referring to FIG. 28, the sleevelike element 171 of the structural embodiment is shown as having a radially disposed stop arm 306 and a radially disposed carryover arm 308 having an outward laterally projecting hook portion 309 disposed at right angles thereto. These arms are functionally equivalent to the notched elbow 172 of element 171 in FIG. 3, stop arm 306 serving to abut a retractible abutment to arrest the rotation of the element and carryover arm 308 serving to engage and pick up the stop arm of the next adjacent control element.

Correspondingly, the control devices 175, 180 and 185 likewise include element 176, 181 and 186 identical with that illustrated in FIG. 28. These sleevelike control elements moreover function in the same manner as the previously described disk elements 171, 176, 181 and 186 illustrated in FIG. 3. Adjacent to the last mentioned control element 185 is a sleeve element 191 which is similar in function to its counterpart disk 191 illustrated in FIG. 3 in that it merely serves to abut a fixed stop. Gear 225 is pinned to shaft 128 by pin 312 and the latter in conjunction with the bevel gear 132 and cooperating snap rings on the shaft act to maintain the elements against axial displacement along the shaft. As shown in FIGS. 24 and 25 the "tens" control devices 170, 175, 180, 185 and 190 include solenoid instrumentalities associated therewith and for this purpose solenoids 200, 205, 210 and 215 and their corresponding bell cranks 201, 206, 211 and 216 are arranged in two groups on the upper left side of output shaft 128 as viewed in FIGS. 24 and 26. As shown in FIGS. 24 and 27 the alternate bell cranks 201 and 211 are mounted for pivotal movement about lower transverse rod 318 while bell cranks 206 and 216 are mounted on an upper similar transverse rod 320. See also FIG 26.

As explained in connection with the operation of the apparatus in FIG. 3, the end control element 191, after partial rotation, engages a fixed stop to terminate the rotation of all of the preceding control elements 171, 176, 181 and 186. In the structural embodiment, this is accomplished by the provision of a fixed arcuate stop element 324 including a radially inwardly extending shoulder 325. See FIGS. 24, 29 and 30. The stop 324 is supported on the frame plate 276 as by pins 326, as seen in FIG. 24. As seen in FIG. 24 the control elements are shown in their "home" position, corresponding to that shown in FIG. 9 and the last control element 191 thereon engages the lower face of the shoulder 325. When rotation is applied in the clockwise direction shown in FIGS. 24 and 29 to all of the sleeve elements on the shaft in succession, the last sleeve 191 will rotate around and abut the end face 325' of the shoulder 325.

The reset gear 227 is associated with control solenoid 234 and its clapper 235, and as explained in connection with FIG. 3, functions to limit the movement of the belt 68 to one cycle of operation, i.e., for moving the tabs 64 and 66 from one to the other of their homing positions. The reset gear 227 is rotatable about stub shaft 330 and as shown is larger than the gear 225 with which it meshes on a shaft 128 and the gear ratio between these two gears is such that shaft 128 will rotate three times to one rotation of the larger gear 227. The reset gear 227 carries integrally therewith a stop portion 332 along the side thereof (see FIGS. 24 and 25) which upon a complete rotation thereof engages a pawl 334 operatively interposed between the previously described homing solenoid 234 and its clapper 235. Energization of solenoid 234 rocks clapper 235 and retracts pawl 334 so that the stop carried by reset gear 227 is free to rotate and thereby commence a cycle of operation of the sheet positioning belt 68. The pawl 334 is mounted on a transverse rod 336 which is similar to the previously mentioned transverse rods 318 and 320 shown in FIG. 24. These three rods, 318, 320 and 336 in addition to providing the pivotal support for the bell crank stopping devices referred to, also provide a structural support to maintain the side frame plate 276 in spaced parallel relationship with the inner plate 272 as shown in FIG. 25. Solenoid bracket frame 338 secures solenoid 234 to side plate 274.

As previously mentioned, the control solenoids 200, 205, 210 and 215 are mounted in two groups within the housing 270 and because of their spacial disposition therein the stopping elements of one group differ slightly from those of the other. More specifically, solenoids 200 and 210 are mounted side by side to form one group and solenoids 205 and 215 are mounted alongside one another to form the other group. This mounting relationship is shown in FIG. 24. FIGS. 29 and 30 show respectively the control exercised by solenoid 200 of the first group and solenoid 205 of the second group. With specific reference to FIGS. 24 and 29, with particular reference to solenoid 200, the bell crank 201 of this solenoid, as well as the bell crank of its companion solenoid 210, includes a hooked end portion **211*a* which, upon movement of the bell crank toward the shaft 128 caused by attraction of the solenoid for its clapper 202, is capable of being interposed into the path of movement of the stop arm 306 of the associated control element 171, see FIG. 29. However, with reference to FIG. 30, it is seen that the bell crank 206 controlled by the solenoid 205, and this applies equally to the bell crank 216 controlled by solenoid 215, does not have a hooked end portion but instead is capable of being interposed by clapper 207 as shown in FIG. 30 so as to be abutted on its extremity by the stop arm 206 of the associated control element 176. The two groups of solenoids are supported on individual bracket frames 340 and 342 shown in FIG. 24, which extend between the internal plate 272 and the outer frame plate 276 and are secured in any suitable manner to the inner faces thereof. In order to restore the bell cranks to their normal retracted position springs are provided for each bell crank for this purpose. Such springs for the bell cranks are shown at 346 in FIGS. 24, 29 and 30. One end of the spring engages an ear on the bell crank and the other end is secured to a transverse pin 348 associated with each group of solenoids and bridging the space between the supporting plates 272 and 276**.

As previously described in connection with the schematic view in FIG. 3, a constant torque is applied to the left hand shaft 122 of the differential through the medium of the friction clutch 124. In the structural embodiment, as shown in FIG. 25, the clutch 124 is directly associated with the mounting of the drive pulley 120 on the end of the shaft 122 projecting beyond the wall 274. The pulley 120 is freely rotatable on this end of the shaft by means of bearings 352 and receives its driving impulses from endless belt 118 as described in connection with FIG. 3. The outer face of the pulley 120 is recessed as at 354 to receive a friction disk 356. Keyed to the shaft 122, such as by the provision of a flat thereon, are a pair of disks or washers 357 and 358 which are urged against the friction disk 356 by resilient means here shown in the form of a cup-shaped resilient disk 360 which is mounted on the extremity of the shaft 122 and reacts against a nut 362 to provide the desired frictional engagement of the faces of the clutch elements so that although a continuous torque is applied to rotate the shaft 122 slippage between the clutch faces may occur when the shaft is restrained from rotation.

The shafts 368 and 369 of each pair of transport rollers extend through an opening in the wall 370 and project beyond the other side thereof for connection to a source of power such as the drive belt 90. As shown particularly in FIG. 32, surrounding each shaft is a non-rotating tubular body having internal bearings for providing a journal for its respective shaft. Referring particularly to FIG. 31, the tubular body for the shaft 368 is indicated at 371 and that for the other shaft at 372. One of the tubular bodies is mounted upon and affixed to a right angle bracket 373 which, as shown in FIG. 31, is secured to the wall 370. Integrally formed with the tubular body 372 is a stationary part 374 of a hinge which forms a trunnion for a yoke 375 integrally connected to the other tubular body 371, the yoke being pivoted on the projecting ends of pin extending through the trunnion and thus providing rocking movement of the shaft 368 and its roller **74*a* with respect to the other shaft and its roller. Such hinge mounting for each pair of transport rollers enables the hinged roller of the two rollers to space itself from the other roller to accommodate varying thicknesses of sheet items transported through the mechanism. The hinge action of members 374 and 375 is described in greater detail in the previously referred to Bradshaw et al. application for patent, it being sufficient to state that the distance between the axes of roller shafts 368 and 369 and hence rollers 74*a* and 74*b*** may vary to suit the thickness of the individual record ledger or document which is to be handled.

A double groove pulley 376 affixed to the inner end of the shaft 369 receives driving belt 90 in one groove and driven belt 88 in the other groove, the former serving to continuously rotate the shaft while the latter transmits the driven impulses to the adjacent pair of transport rollers as shown in FIG. 18. Roller shaft 369 drives its companion shaft 368 through meshing gears 377 and 387.

To provide the desired frictional drive so that the rollers **74*a* and 74*b* may be restrained from rotation when the sheet or ledger which they engage is stopped from movement while at the same time applying driving torque thereto, a friction clutch is located in roller 74*a* and 74*b* for this purpose. With particular reference to FIG. 32, such a frictional clutch is shown for roller 74*a*, it being understood that a similar provision is made for each of the companion rollers 74*b*. Each roller is journaled for free rotation on the shaft 368 clutches by means of bearings 381. Within a counter bore 382 on the inner end of each roller there is provided a balance of friction disks 383 and 384 positioned between the end of the roller and a collar 385 axially slidable on the shaft but keyed thereto by joint rotation therewith. A compression spring encircling the shaft biases the collar against the friction disk and the end wall of the roller to frictionally couple the roller to its respective shaft and yet provide the desired slippage in the event the roller is restrained from rotation by the stoppage of the sheet item which it engages. The rollers are adapted to maintain the marginal edges of the sheet items or ledgers which they grip in alignment with the base of a side edge aligning channel shaped member, the side edge aligning guide 84** previously described in connection with FIG. 3. For this purpose, each roller assembly is secured to its respective hinge member so that its axis of rotation lies on an angle slightly less than 90° to the base of the aligning guide and in the direction to the feed of the sheet items.

Additional sets of gripper rollers 390 are utilized in the sheet advancing guideway of the line selecting mechanism for purposes hereinafter described and are interposed between the upper two sets of rollers 74—74 as seen in FIG. 18. As shown in greater detail in FIG. 33 each set comprises an upper roller assembly **390*a* and a lower assembly 390*b* as viewed in FIG. 33. The upper roller assembly 390*a* is mounted on outer plate 80 by means of angle bracket 392 and by stud 394. A ring-shaped roller member 395 carrying an O ring 396 having high frictional characteristics is suitably journalled on the stud 394. The lower roller assembly 390*b* is of similar construction but does not include the O ring. This roller assembly is secured to the wider side or wall 391 of the channel shaped guide 84 by means of a spacer block 393 and spring tab 395 which resiliently urges the rollers 390*a*, 390*b*** into contacting engagement with each other.

The sets of gripper rollers 390 cooperates with a document which has been stopped in the guideway of the line selecting mechanism to minimize the pivoting effect thereon which may be introduced by the sudden acceleration of the document to transport velocity by the driver rollers 74 at the time of the ejection of the document from the mechanism. The friction clutches in rollers 74 represented by disks 383, 384 are of light construction to enable the rollers to stop instantaneously when the documents are stopped by either of the abutments 64, 66 of the sheet positioning belt 68. The rollers 74 are preferably small and are light in weight also and therefore have low inertia to enable them to stop instantly as the disk clutches slip. As a posting operation is completed and the line-selecting belt is released and the stops thereon are moved along the path between the plates in a direction to permit the ejection of the sheet from guideway, the associated rollers will instantaneously apply a high torque along one edge of the document. Since the remaining portion of the document has a high inertia the rollers 74 tend to impart a turning movement on the document. However, the gripper roller assemblies 392 being in line with the rollers 74, greatly minimize the tendency of the document to turn as it is brought up to speed.

A desirable feature of the line selecting mechanism is the provision for gaining ready access to the sheet feeding guideway thereof formed by the outer and inner plates 80 and 82.

Referring to FIGS. 3 and 18 to 22, inclusive, and with particular reference to FIGS. 18 and 19, it is observed that the outer and inner plates 80 and 82 are movably supported in order to permit access to the fanfold documents which assume the path indicated by reference character 48 about platen 22 shown in FIG. 2, also for the purpose of facilitating the clearance of the guideway which normally exists between the two plates in the event that the ledgers become jammed in their passage between the plates. For this purpose the outer plate 80 is mounted for pivotal movement as by aligned hinge mountings 410 and 412, the former being secured to internal wall 370 and the latter to a supporting member 413 secured to internal wall member 414, see FIG. 18. The inner plate 82 is mounted for pivotal movement as by aligned hinge mountings 416 and 418. The hinge 416 is supported by angle bracket 417 which in turn is secured to internal wall 370. Opposite hinge 418 is fastened to supporting member 413 and thus to the internal wall 414.

The hinge mountings associated with the two plates 80 and 82 are spring loaded to yieldingly urge clockwise travel of the plates about their respective pivot axes. FIG. 20 shows the two plates in closed position whereas FIGS. 21 and 22 show an open position of the outer and inner plate respectively. A stop 422, affixed to supporting member 413 shown in phantom outline in FIGS. 20–22, protrudes through a cutout 423 of the inner plate 82 and to serve as an abutment for the lower surface of the outer plate to limit the inward movement of the same toward the inner plate. Correspondingly, stop 424 also mounted on member 413 limits the counterclockwise travel of the inner plate 82.

The two stops 423 and 424 act to space the plates from one another in their closed position to form the guideway therebetween for the feed of ledgers therethrough.

Latching means are provided to keep the plates in their normal closed positions abutting the stops 422 and 424 respectively, and for this purpose the outer plate carries a bracket 426 which includes pin 427 projecting therefrom, see FIG. 21. A latching finger 428 having cutout 429 therein is pivotally mounted at 430 to the plate 413 and is springloaded to urge the finger to its latching full line position shown in FIG. 20. When the upper plate is manually moved in a counterclockwise direction the pin 427 cams the spring load latching finger 428 in a like direction until the pin and cutout 429 are in interlocking engagement as seen in FIG. 20. In a similar manner latching devices are provided to secure the inner plate 82 in its normal closed position as shown in FIG. 22. A hooked finger 432 projecting from the inner face of plate 82 is adapted to cam latching finger 434 about its pivot 436 counterclockwise to the phantom line position shown and against the resistance of spring 438, the latter thereafter returning the finger 434 to its latching full line position shown in FIG. 20.

The readout device generally indicated at 252, and previously described in connection with FIG. 3 is shown in detail in FIGS. 34 to 37 inclusive. As previously described in connection with FIG. 3 the readout device is operated from shaft 256 which is coupled by gear 258 to shaft 112 which drives the sheet positioning belt 68 through pulley 72. In the structural embodiment of the invention illustrated herein, the readout device employs optical instrumentalities.

The light source 256 previously referred to in connection with FIG. 3 may be composed of a plurality of separate lamps 450 which as shown in FIGS. 34 and 35 are arranged in two rows on a sub-assembly 452 which is mounted on an apertured sub-frame 454 which in turn is mounted on the stationary housing 264 enclosing the rotatable drum 254. As shown in FIG. 35, the housing is provided with apertures 456 therethrough aligning the lamps and the apertures in the sub-frame 454. When any one of the coded holes of the drum are in registration with a hole 456 in the housing the light passing through such holes in the drum will be received by one of the light sensitive elements 269 in the fixture 268 which projects into the drum through the opened end thereof. The fixture 268 is in the form of an oblong block curved to the curvature of the drum and is fixed or integrally connected to a circular plate 458. This plate in turn is secured to the flange 460 on the housing 264 and forms a light tight seal for the open end of the drum. The light sensitive elements 269 may be photo-diodes or photocells as previously mentioned in connection with FIG. 3, and each is provided with an electrical lead extending from the base thereof as indicated in FIG. 34, all of which may be assembled into a cable 462 which passes out through an electrical insulating grommet secured in a hole 464. The closed end of the perforated drum 254 is fixed to the end of the shaft 256 which is journalled for rotation at its opposite ends in the manner shown in FIG. 34.

The coding used to convert the mechanical position of the sheet stopping tabs 64 and 66 to electrical signals may be of any suitable kind. In the illustrated embodiment of the invention the coded perforations on the drum 254 convert positions of the endless belt 68 and its tabs from decimal notation to binary notation so that the electrical signals provided by the leads in the output cable 462 are binary in form for subsequent utilization. A desirable coded arrangement of the perforations in the drum periphery is that shown in the developed view in FIG. 37 where the entire periphery of the drum is laid out in one plane.

The lamps 450 as well as the photo-diodes 269 are staggered to form two rows rather than one longer row to facilitate a more economical and compactly arranged device. More particularly, as shown in FIG. 36, three of the seven lamps 252 are disposed in a rear row while the four remaining lamps are disposed in a front row. The lamps in each of the rows are moreover offset with respect to each other so as to be aligned with seven columns of perforations on the drum 254 as shown in FIG. 37. Each row of perforations on the drum's periphery represents a position of the sheet positioning belt and the tabs thereon. As further shown in FIG. 37, the rows are numbered along the left margin in accordance with the number of positions of the belt, fifty such positions representing printing lines and the remaining ten positions representing those positions in which the stopping tabs are in the curved portions of their locus of travel and consequently are not in the guideway for stopping a document therein. The four columns of perforations of the drum identified with the notation "1—2—4—8" correspond to the "units" value of the line selecting belt while the three columns identified with the notation "1—2—4" correspond to the "tens" value thereof.

In the coded arrangement illustrated herein, the rows of holes on the drum exhibit a zigzag line pattern to conform with the staggered arrangement of the lamps 450 and the light beam directing holes. Therefore, starting from its numbered position in the leftmost column, each row of perforations on the drum assumes a zigzag pattern. This is indicated by the zigzag line A in FIGS. 36 and 37. Thus, in the example shown in FIG. 36, a segmental portion 470 of the drum 254 is shown which includes the perforation opposite to the numbers "17", "18" and "19" along the left margin of FIG. 37. In this example, the belt 68 has been positioned to present the 17th line of a document opposite to the platen 22 for printing thereon by the printer 20, FIG. 3. Thus the sheet positioning belt 68 has, through pulley 70, shaft 112, gears 262 and 258, rotated drum 254 by means of shaft 256 so that segment 470 of drum 254 is disposed between the lamps 452 and the photodiodes 269. All of the lamps 452 are lighted but only the light from four of these lamps as indicated in heavy outline find registered holes in the drum for energizing the corresponding light sensitive elements 269 in fixture 268. In the example presented herein, the light from the lamps 450 scan the 17th line printing position represented by the zigzag line A and finds the four unblocked holes diagrammatically shown in FIG. 36. In other words, each line position represented by a row on the drum in FIG. 37 actually employs another row which is two rows therebeyond to signify its line position. To facilitate this understanding, the segmental portion 470 of the drum has been shown in dotted outline in FIG. 37. In the example provided for illustration, light beams are passed through registered holes along the 17th row in "units" code columns "1", "2" and "4" and also through one registered hole occurring in the "tens" code column "1". The signals derived from the light sensitive elements impinged by the light beams add to the sum seventeen, thus indicating the 17th printing line of the belt 68.

Although various types of clutches may be used through which to drive the endless belt 68 and yet permit stoppage thereof without interruption of the driving torque applied thereto, a desirable construction for the clutch 114 is shown in FIG. 38. In this figure the half-shafts 110 and 112 are shown in alignment and connected together by the clutch device. An inner member 480 of the clutch device is fixed to the adjacent end of the driving shaft 110 and enters a bell shaped member 482 of the clutch device which is fixed to the adjacent end of the driven shaft 112. In the annular space between the inner member 480 and the bell shaped member 482 there are provided two series of alternately interleaved clutch elements, one series of which indicated at 484 are composed of friction material and the other series of which indicated at 486 are composed of metallic material. The friction elements 484 are free, i.e., they are unconnected to either the driving or driven members of the clutch. However, the series of metallic clutch elements 486 are alternately axially slidably keyed to the driving and driven members of the clutch. The clutch elements are yieldingly compressed together by a coiled spring 488 acting on a collar 490 axially movable on inner member 480 and shaped to bear against one end of clutch elements as shown in FIG. 38. The opposite end of the coiled spring is seated upon an adjustable collar 492 which is threaded upon the inner clutch member 480 and locked in adjusted position by lock nuts 494. The clutch device 140 is designed to receive suitable lubrications as is customary for this type of clutch.

In summary, it is to be noted that the invention as represented by the apparatus illustrated and described herein provides improved means for handling sheet items and the like and more particularly for stopping such sheet items in transit at selected line positions. More specifically the mechanism for stopping a selected sheet item comprises one or more sheet abutting tabs movable in a sheet feeding guideway and controlled by external signals to stop in the guideway at the desired position. Facilitating the speed of operation of the mechanism is the arrangement whereby the sheet abutting stop transverses a path of movement through the guideway and in the same direction as the feed of the sheet items therethrough and is quickly removed therefrom in the same direction as the sheet items are ejected. Of importance to the attainment of the objects of the invention is the provision of control means presettable prior to the document reaching the printing position at which it is to be stopped. A part of this control means is a differential gear mechanism and associated rotatable control elements, the latter being responsive to signals for limiting the extent of movement of the differential. The differential is so designed as to receive a continuous torque in one direction and yet upon the completion of a cycle of movement of the sheet stopping means will reset the control elements by reversing their rotation while continuing to apply the torque in the same original direction.

The invention has been illustrated and described in connection with a bank ledger processing machine in which ledger sheets are sequentially fed through a transport mechanism. Such ledger sheets are provided with code data signifying various information including the next available line for printing information thereon. Such coded data in the present machine is impressed upon magnetic stripes carried on the back side of each ledger sheet. In the operation of the machine herein illustrated, the new line position for printing is sensed before the ledgers reach the printer component thereof and this information may be utilized to provide the signals for operating the control elements of the differential mechanism. Subsequently, after such a ledger has received data in the form of printing impressions thereon, which data may be visible through the transparent front plate of the line selecting mechanism of this invention, its last printed line position is detected and during the discharge of the ledger from the mechanism the detected information is utilized to impress data on the magnetic stripes on the ledger signifying the next available line thereon for printing.

What we claim is:

1. Apparatus for handling sheet items comprising, in combination, means defining a path through which sheet items are fed, means for sequentially feeding sheet items along the path, a sheet stopping abutment, means for moving the abutment along said path, a plurality of abutment position control means operatively associated with said moving means and each effective to stop the abutment at a position individually significant of the control means, said control means being accumulatively effective on the operation of the moving means and providing a number of abutment stopping positions in said path exceeding the number of abutment position control means, and means for permutably operating the plurality of control means to select any one of the stopping positions of the abutment along the path.

2. Apparatus according to claim 1 wherein said control means further includes means for effecting incremental stepping of said abutment means along said guideway.

3. Apparatus for handling sheet items comprising, in combination, means defining a guideway, transport means for advancing sheet items sequentially along said guideway, an endless belt mounted adjacent to said guideway, a tab carried by said endless belt for movement into and along said guideway in the direction of the feed of said sheet items therein, said tab being adapted when stopped in said guideway to obstruct the passage of sheet items therealong, drive means for moving said endless belt, means responsive to an electrical signal for initiating operation of said drive means so that said tab is moved by the endless belt into the guideway between the adjacent edges of a selected pair of sheet items advancing therethrough, a plurality of tab positioning means operatively associated with said drive means and each effective to limit the movement of the endless belt to a distance differing from the others so as to stop the tab in the guideway at a sheet obstructing position individual to that tab positioning means, said plurality of tab positioning means being accumulatively effective on the operation of the drive means so as to provide a greater number of tab stopping positions than the number of tab positioning means, and means under the control of electrical signals for permutably operating the tab positioning means to thus control the sheet obstructing position of the tab in the guideway.

4. Apparatus for handling sheet items comprising, in combination, means defining a guideway, transport means for advancing sheet items sequentially along said guideway, an endless belt mounted adjacent to said guideway, a tab carried by said endless belt for movement into and along said guideway in the direction of the feed of said sheet items therein, said tab being adapted when stopped in said guideway to obstruct the passage of sheet items therealong, drive means for moving said endless belt, means for initiating operation of said drive means to cause the endless belt to move said tab into the guideway between the adjacent edges of a selected pair of sheet items advancing therethrough, a plurality of tab positioning means operatively associated with said drive means and each effective to limit the movement of the endless belt to a distance from a zero reference position differing from the others so as to stop the tab in the guideway at a sheet obstructing position corresponding to the tab positioning means, said plurality of tab positioning means being accumulatively effective on the operation of the drive means and providing a number of tab stopping positions in the guideway exceeding the number of the tab positioning means, means for permutably operating the stopping means thus to initially move the tab into the guideway to a sheet obstructing position therein, and means to step said tab incrementally along said guideway.

5. In apparatus for arresting a moving sheet item in accordance with electrical signals receiving by the apparatus, means defining a guideway, means for sequentially feeding sheet items through the guideway, sheet stop means movable into said guideway and adapted to be selectively positioned therealong, drive means for so moving said sheet stop means, and means for stopping said drive means including a plurality of solenoids associated therewith which upon receipt of said electrical signals permutably actuates the sheet stop means whereby said sheet item is stopped at a preselected position along the guideway.

6. In apparatus for arresting a moving sheet item in accordance with electrical signals received by the apparatus, means defining a guideway, means for sequentially feeding sheet items through the guideway, sheet positioning means movable through a locus of points a portion of which coincide with said guideway and which obstruct the passage of a sheet item when so located in the guideway, drive means for moving said sheet positioning means through said locus of points, and means for stopping said drive means including a plurality of solenoid means associated therewith which upon receipt of said electrical signals permutably actuates the stop means to arrest the movement of the drive means which in turn causes the sheet positioning means to be arrested at a preselected position along the guideway.

7. Apparatus for arresting a moving sheet item in accordance with electrical signals received by the apparatus, means defining a guideway, means for sequentially feeding sheet items through said guideway, means to enter said guideway for obstructing the passage of a sheet item therealong, rotatable means for driving said last named means, a plurality of rotation limiting means associated with said last named means, solenoid means associated with said rotation limiting means which upon receipt of said electrical signals arrests the movement of said drive means to thereby cause said obstructing means to be arrested at a predetermined location along said guideway, and means associated with said solenoid means for causing said obstructing means incrementally to step through said guideway.

8. In apparatus for arresting a moving sheet item in accordance with electrical signals received by the apparatus, means defining a guideway, means for sequentially feeding sheet items into and through said guideway, an endless belt disposed along said guideway, a sheet stop tab fixed to said endless belt means and adapted to be moved by the belt into and along said guideway to obstruct the passage of a sheet item fed therealong, drive means for moving said endless belt whereby said tab is moved into said guideway, stop means associated with said drive means, and a plurality of solenoids associated with said stop means which upon receipt of said electrical signals permutably actuates said stop means whereby said tab is halted in a preselected position along said guideway to stop a sheet item.

9. Apparatus for arresting a moving sheet item in accordance with electrical signals received by the apparatus, means defining a guideway, means for sequentially feeding sheet items into said guideway, an endless belt disposed along said guideway, a tab affixed to said endless belt means and adapted to be moved into and along said guideway to obstruct the passage of a sheet item moving along the latter, and thereafter to be withdrawn from the guideway, drive means connected to said endless belt means, arm means fixed to said drive means, a plurality of rotation limiting devices encircling said drive means and adapted to limit rotation of said drive means through said arm means, each of said rotation limiting devices including a portion thereof adapted to engage an adjacent device, and solenoid means associated with said devices for selectively arresting their movement upon receipt of electrical signals whereby the tab carried by said endless belt is caused to arrest the movement of a sheet item in a location within said guideway in accordance with the electrical signals received by said solenoids.

10. Apparatus for arresting the movement of sheet items in accordance with electrical signals received by the apparatus, means defining a guideway, means for sequentially feeding sheet items along said guideway, sheet stop means, means for moving said stop means into said guideway to be positioned therealong to arrest the movement of a preselected item at a given location or locations in the guideway and thereafter to be withdrawn from said guideway to permit the free passage of sheet items therethrough, first and second drive means, differential gear means interconnecting said first and second drive means for so driving said sheet stop moving means, means extending radially from said first drive means, a plurality of sleeve means encircling said second drive means and each including a projecting portion which is engageable with a corresponding projecting portion of an adjacent sleeve member, means connecting one of said sleeve means to said differential gear means, and a plurality of solenoid means engageable with said radially extending means and said sleeve means and permutably responsive to said electrical signals to arrest both of said drive means thereby to cause said stop means to be arrested at given locations in the guideway.

11. Apparatus as set forth in claim 10 wherein ones of said plurality of solenoid means are peripherally disposed and equally spaced relative to said first drive means.

12. Apparatus as set forth in claim 10 and further including gear means connected to said second drive means, stop means carried by said gear means, and solenoid means in one position thereof engaging said stop means to prevent the movement of said gear means and said second drive means, and movable to a second position in response to an electrical signal to permit the movement of said second drive means.

13. Apparatus as set forth in claim 10 wherein said sheet stop means includes an endless belt, and a pair of elements projecting from and equally spaced about the periphery of said belt.

14. Apparatus as set forth in claim 10 wherein said differential gear means including a first gear carried by and rotatable about the axis of said first drive means, a second gear meshing with said first gear and mounted for bodily movement on said second drive means and rotatable about an axis of rotation normal to the axis of rotation of said second drive means, and a third gear meshing with said second gear and mounted for rotation relative to said second drive means and about the same axis of rotation thereof.

15. Sheet feeding and stopping apparatus comprising, a guideway, means for feeding sheets along said guideway, an endless belt adjacent said guideway, first and second spaced pulleys for mounting said endless belt for movement about an orbital path, a sheet stop tab carried by said endless belt for movement into and along said guideway in the direction of feed of the sheet items therein, said tabs being effective when stopped within said guideway to obstruct the passage of sheet items therealong, a first drive means for rotating the first of said pulleys to so move said endless belt, differential gear means including a pair of spaced first and second opposed gears and a spider gear rotatable therebetween, a shaft connecting said second pulley to said spider gear bodily to rotate the latter, said first opposed gear being mounted on said shaft for rotation thereabout, a second drive means for rotating said second opposed gear, a plurality of stop means for arresting said second opposed gear in one of a plurality of angular positions during rotation thereof, a series of elements on said shaft and associated with said first opposed gear, arm means extending from each of said elements in a manner successively to engage the next of said elements with each revolution of said first opposed gear, and means cooperating with said arm means for stopping the rotation of said first opposed gear after a predetermined number of rotations, thereby to cause said endless belt to move said tab partially about its orbital path to a position within said guideway determined by the sum of the movements of said second drive means and said shaft, thereby to stop a sheet moving through said guideway.

16. Sheet feeding and stopping apparatus comprising, a guideway, means for feeding sheets along said guideway, an endless belt adjacent said guideway, first and second spaced pulleys for mounting said endless belt for movement about an orbital path, a plurality of sheet stop tabs carried by said endless belt in positions equally spaced from each other about said belt and normally out of said guideway but for movement individually into and along said guideway in the direction of feed of the sheet items therein, said tabs being effective when stopped within said guideway to obstruct the passage of sheet items therealong, a first drive means for rotating the first of said pulleys to so move said endless belt, differential gear means including a pair of spaced first and second opposed gears and a spider gear rotatable therebetween, a shaft connecting said second pulley to said spider gear bodily to rotate the latter, said first opposed gear being mounted on said shaft for rotation thereabout, a second drive means for rotating said second opposed gear, a plurality of stop means for arresting said second opposed gear in one of a plurality of angular positions during rotation thereof, a series of elements on said shaft and associated with said first opposed gear, arm means extending from each of said elements in a manner successively to engage the next of said elements with each revolution of said first opposed gears, means cooperating with said arm means for stopping the rotation of said first opposed gear after a predetermined number of rotations, thereby to cause said endless belt to move said tab means partially about its orbital path to a position within said guideway determined by the sum of the movements of said second drive means and said shaft, thereby to stop a sheet moving through said guideway, and means to cause said belt to reset said tabs to their normal positions out of said guideway.

17. Sheet feeding and line selecting apparatus comprising, a guideway, means for feeding sheets along said guideway, an endless belt, first and second spaced pulleys for mounting said endless belt for movement about an orbital path, a sheet stop tab carried by said endless belt for movement into and along said guideway in the direction of feed of the sheet items therein, said tab being effective when stopped within said guideway to obstruct the passage of sheet items therealong, a first drive means for rotating the first of said pulleys to so move said endless belt, differential gear means, said differential gear means including a pair of spaced first and second opposed gears and a spider gear rotatable therebetween, a shaft connecting said second pulley to said spider gear bodily to rotate the latter, said first opposed gear being mounted on said shaft for rotation thereabout, a second drive means for rotating said second opposed gear, a plurality of stop elements arranged to arrest rotation of said second opposed gear in one of a plurality of angular positions during rotation thereof, and a succession of elements on said shaft and associated with said first opposed gear, overlapping abutments extending from said elements in a manner successively to engage the abutment of the next of said elements with each complete revolution of said first opposed gear, means cooperating with said abutments for stopping the rotation of said first opposed gear after a predetermined number of rotations, thereby to cause said endless belt to move said tab means partially about its orbital path to a position within said guideway determined by the sum of the rotative movements of said second drive means and said shaft, thus to stop the sheet in a predetermined line selected position in said guideway, and means controlling the apparatus for stepping said tab incrementally line by line through said guideway to present successive sheet lines to said predetermined position.

18. Sheet feeding and line selecting apparatus comprising, a guideway, means for feeding sheets along said guideway, an endless belt, first and second spaced pulleys for mounting said endless belt for movement about an orbital path, a pair of sheet stop tabs carried by and equally spaced about said endless belt for movement individually into and along said guideway in the direction of feed of the sheet items therein, said tabs being effective when stopped within said guideway to obstruct the passage of sheet items therealong, a first drive means for rotating the first of said pulleys to so move said endless belt, differential gear means, said differential gear means including a pair of spaced first and second opposed gears and a spider gear engaging both first and second gears and rotatable therebetween, a shaft connecting said second pulley to said spider gear bodily to rotate the latter, said first opposed gear being mounted on said shaft for rotation thereabout, a second drive means for rotating said second opposed, gear, a plurality of line by line stop elements arranged to arrest rotation of said second opposed gear in one of a plurality of angular positions during rotation thereof, each angular position being representative of a line spacing, and a succession of elements on said shaft and associated with said first opposed gear, each element being representative of a plurality of line spaces, overlapping arms extending from said elements in a manner successively to engage the arm of the next of said elements with each complete revolution of said first opposed gear, means cooperating with said arms for stopping the rotation of said first opposed gear after a predetermined number of rotations, thereby to cause said endless belt to move one of said tabs partially about its orbital path to a position within said guideway determined by the sum of the rotative movements of said second drive means and said shaft, thus to stop the sheet in a predetermined line selected position in said guideway equal to said sum, means controlling the apparatus to step said tab incrementally line by line through said guideway to present successive sheet lines to said predetermined positon, and means to reset said tab to a positon out of said guideway to permit said sheet to continue on through said guideway.

19. Apparatus for moving sheet items to predetermined line positions for effecting printing or other operations on said lines, said apparatus comprising: a guideway through which said items are moved, said guideway being defined by a pair of inner and outer plates pivotally mounted in closely spaced parallel relationship, and latch means for releasably holding said plates in said relationship; means for moving sheet items through said guideway; and means for stopping said sheets in pre-selected positions in said guideway whereby selected lines on said sheets are presented for operation thereon, said means comprising an endless belt positioned with a surface portion thereof co-extensive with a portion of said inner plate and positioned within a cutout portion of said plate, a sheet stopping abutment on said belt and normally out of said guideway, and means for rotating said belt in a path to move said abutment to a predetermined position within said guideway and in the path of said sheet items, thus to stop said sheets in said preselected position.

20. Apparatus for moving sheet items to predetermined line positions for effecting printing on said lines, said apparatus comprising: a guideway through which said items are moved, said guideway being defined by a pair of inner and outer plates pivotally mounted in closely spaced parallel relationship, latch means for releasably holding said plates in said relationship, means for moving sheet items through said guideway, means for stopping said sheets in pre-selected positions in said guideway whereby selected lines on said sheets are presented for operation thereon, said means comprising an endless belt positioned with a surface portion thereof co-extensive with a portion of said inner plate and positioned within a cutout portion of said plate, a sheet stopping abutment on said belt and normally out of said guideway, and means for rotating said belt in a path to move said abutment to a predetermined position within said guideway and in the path of said sheet items, thus to stop said sheets in said preselected position, said outer plate being transparent whereby the printing upon said sheet is visible to an operator.

21. Apparatus for moving sheet items to predetermined line positions for effecting printing or other operations on said lines, said apparatus comprising: a guideway; means for moving items through said guideway; said guideway being defined by a pair of inner and outer plates pivotally mounted in closely spaced parallel relationship, and latch means for holding said plates in said relationship, but releasable for permitting pivotal movement of said plates either singly or together; means for moving sheet items through said guideway; means for stopping said sheet items in a pre-selected position in said guideway whereby a selected line on a sheet item may be presented for operation thereon, said means comprising an endless belt positioned with a surface portion thereof substantially co-extensive with a portion of one of said plates, a sheet stopping abutment on said belt and normally out of said guideway, and means for moving said belt in a path to move said abutment to a predetermined position within said guideway and in the path of said sheet items, thus to stop a selected sheet item in said preselected position; and side edge guide means for the sheet items extending substantially throughout the length of said guideway and aligned with the space between said plates.

22. Apparatus for handling sheet items comprising, in combination, a guideway through which said sheet items are moved; said guideway being defined, at least in part, by a pair of plate-like members mounted in parallel, slightly spaced apart relation to define that portion of the guideway in which they lie; means for moving sheet items through said guideway; means for stopping said sheet in any one of a plurality of preselected positions in said guideway whereby a selected line of such a stopped sheet is presented for operation thereon, said sheet stopping means including a movable endless belt positioned with a portion thereof substantially co-extensive with a portion of one of said plate members, and a sheet stopping abutment carried by the belt and movable thereby into a sheet obstructing position in the guideway between the plate members for stopping a sheet item therein and movable thereby to another position out of the guideway for allowing free flow of sheet items therethrough; and means responsive to control signals for moving said belt so that the portion thereof co-extensive with one of the plate members moves in the direction of the passage of the sheet items through the guideway and for stopping the belt with the abutment thereon in a preselected position within the guideway, thus to stop a sheet item at a selected line position.

23. Apparatus for handling sheet items comprising, in combination, a guideway through which said sheet items are moved; said guideway being defined, at least in part, by a pair of plate-like members mounted in parallel, slightly spaced apart relation to define that portion of the guideway in which they lie; means for moving sheet items through said guideway; a movable endless belt positioned with a portion thereof substantially co-extensive with a portion of one of said plate members; and a sheet stopping abutment carried by the belt and movable thereby into a sheet obstructing position in the guideway between the plate members for stopping a sheet item therein and movable thereby to another position out of the guideway for allowing free flow of sheet items therethrough; means responsive to control signals for moving said belt so that the plate co-extensive portion thereof moves in the direction of the passage of the sheet items through the guideway and for stopping the belt with the abutment thereon in a preselected position within the guideway, thus to stop a sheet item at a selected line position; and means mounting the other of said plate members for movement away from the guideway for providing access thereto.

24. Apparatus for handling sheet items comprising, in combination, a guideway through which said sheet items are moved; said guideway being defined, at least in part, by a pair of plate-like members mounted in parallel, slightly spaced apart relation to define that portion of the guideway in which they lie; means for moving sheet items through said guideway; a movable endless belt positioned with a portion thereof substantially co-extensive with a portion of one of said plate members; said other member being composed at least in part of light permeable material for rendering the sheet items visible therethrough; and a sheet stopping abutment carried by the belt movable thereby into a sheet obstructing position in the guideway between the plate members for stopping a sheet item therein and movable thereby to another position out of the guideway for allowing free flow of sheet items therethrough; and means responsive to control signals for moving said belt so that the plate co-extensive portion thereof moves in the direction of the passage of the sheet items through the guideway and for stopping the belt with the abutment thereon in a preselected position within the guideway, thus to stop a sheet item at a selected line position.

25. In association with a printer, means defining a guideway, means for sequentially feeding sheet items through the printer, abutment means movable into the path of the sheet items and in the direction of feed of the items, drive means for moving said abutment means, and means for arresting said drive means to stop said abutment means including a plurality of control devices associated therewith, each providing a different distance of movement of the abutment means along the guideway and accumulatively effective to sum their different distances of movement to stop the abutment means at more positions than represented by the number of control devices.

26. In association with a printer, means defining a guideway for sequentially feeding sheet items in one direction through the printer, stop means in said guideway for obstructing a sheet item therealong, rotatable means for advancing said stop means along the guideway, a plurality of rotation limiting means associated with said rotatable drive means and operable to limit the rotation of the rotatable driving means to different angular positions, and signal responsive means associated with said plurality of rotation limiting means and operable to cause said stop means to be arrested at any one of a plurality of predetermined locations along the guideway and thus stop a sheet item in the guideway at a location for receiving printing impressions from the printer on a selected line.

27. Control mechanism for limiting the angular movement of a rotatable member comprising, in combination, differential gear means including a pair of spaced apart first and second opposed gears and a third gear positioned therebetween and meshing with the first and second gears, a shaft connected to said third gear, said first opposed gear being mounted on said shaft for rotation thereabout, drive means applying separate torque to rotate the shaft and the second gear, a plurality of stopping elements associated with second opposed gear and operable to limit the extent of its rotation to any one of a plurality of angular positions, a second plurality of stopping elements associated with said first opposed gear axially spaced apart and rotatively journalled on the shaft, arm means extending from each of said second elements in a manner successively to engage the next of said second elements for rotating the same with each revolution of the first opposed gear, and separate means associated with each of said arm means for stopping the rotation of its opposed gear.

28. Control mechanism for limiting the angular movement of a rotatable member comprising, in combination, a rotatable member, differential gear means including a pair of spaced apart first and second opposed gears and a third gear positioned between the first and second gears and meshing therewith, means connecting said rotatable member to said third gear for joint rotation, drive means for separately applying a continuous torque to the rotatable member and said second gear, a plurality of first stop means associated with said first gear and operable to limit the extent of its rotation to different angular positions, a second plurality of second stop means associated with said second gear and operable to limit the extent of its rotation to different angular positions, and control means for rendering each of said first and second stop means effective to limit the rotation of its respective gear.

29. Apparatus for arresting sheet items in accordance with electrical signals received by said apparatus, comprising, in combination, means for moving sheet items along a given path, sheet stop means movable into said path and adapted to be positioned at one of a plurality of positions along said path, drive means operatively connected to said stop means for advancing the same into and along said path, said drive means including differential gear means, first and second rotation limiting means associated with said gear means for arresting said drive means, said first means adapted to limit said drive means to unitary increments of angular rotation and said second means being adapted to limit said drive means to multiple increments of angular rotation, and means under control of electrical signals associated with said first and second rotation limiting means for permutably actuating the same whereby said drive means may be stopped to position said sheet stop means at a predetermined location along said path.

30. The apparatus as set forth in claim 29 wherein the first and second control means each include individual settable means which in combination limit the interaction of said differential gear members to thereby control the extent of driving movement imparted to said sheet stop means by said drive means, and upon receipt of successive electrical signals by said first control means the setting of said first control means may be changed without affecting the initial setting applied to said second control means to thereby permit further interaction of said differential gear means.

31. Apparatus for arresting sheet items in accordance with electrical signals received by said apparatus comprising in combination, means for moving said sheet items along a given path, means movable into said path and adapted to be positioned at a plurality of locations along said path to stop sheet items therealong, drive means including first and second shaft means for moving said sheet stop means, differential gear means interconnecting said first and second shaft means and including a first gear affixed to said first shaft means, a second gear encircling and rotatable about said second shaft means, and a spider gear in intermeshing engagement with said first and second gears and carried for rotation by said second shaft means, a plurality of radially disposed rotation limiting means for arresting said first gear, a plurality of axially aligned rotation limiting means encircling said second shaft means for arresting the rotation of said second gear, and electrical signal means for permutably operating said radially disposed and said axially aligned rotation limiting means to thereby limit the interaction of said differential gear means to arrest said sheet stop means at a selected position along said path.

References Cited in the file of this patent

UNITED STATES PATENTS

| | | |
|---|---|---|
| 1,286,714 | Moore | Dec. 3, 1918 |
| 2,056,393 | Didzuns | Oct. 6, 1936 |
| 2,101,268 | Novick | Dec. 7, 1937 |
| 2,181,992 | Ghertman | Dec. 5, 1939 |
| 2,406,006 | Eckhard | Aug. 20, 1946 |
| 2,831,560 | Oberholzer et al. | Apr. 22, 1958 |
| 2,849,235 | Laufer | Aug. 26, 1958 |
| 2,875,883 | Miles | Mar. 3, 1959 |